(12) United States Patent
Sawada et al.

(10) Patent No.: US 9,381,836 B2
(45) Date of Patent: Jul. 5, 2016

(54) VEHICLE SEAT HOUSING APPARATUS

(75) Inventors: Makoto Sawada, Wako (JP); Tadao Kitagawa, Utsunomiya (JP); Junichi Yoshioka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/006,216

(22) PCT Filed: Mar. 22, 2012

(86) PCT No.: PCT/JP2012/057267
§ 371 (c)(1),
(2), (4) Date: Sep. 19, 2013

(87) PCT Pub. No.: WO2012/133078
PCT Pub. Date: Oct. 4, 2012

(65) Prior Publication Data
US 2014/0015273 A1 Jan. 16, 2014

(30) Foreign Application Priority Data

Mar. 25, 2011 (JP) .................................. 2011-068130

(51) Int. Cl.
*B60N 2/30* (2006.01)
*B60N 2/36* (2006.01)

(52) U.S. Cl.
CPC *B60N 2/30* (2013.01); *B60N 2/305* (2013.01); *B60N 2/3011* (2013.01); *B60N 2/3065* (2013.01); *B60N 2/3079* (2013.01); *B60N 2/36* (2013.01)

(58) Field of Classification Search
CPC ........ B60N 2/30; B60N 2/3011; B60N 2/305; B60N 2/36; B60N 2/3079; B60N 2/3065
USPC ...................................................... 296/65.09
See application file for complete search history.

(56) References Cited

U.S. PATENT DOCUMENTS 6,435,589 B2 * 8/2002 Shimizu et al. ............ 296/65.09
7,559,594 B2 * 7/2009 McMillen .................. 296/65.09

(Continued)

FOREIGN PATENT DOCUMENTS

GB 164926 A 6/1921
GB 301614 A 12/1928

(Continued)

OTHER PUBLICATIONS

Extended European search report dated Jul. 25, 2014 issued in the corresponding EP Patent Application 12765204.8.

(Continued)

*Primary Examiner* — Glenn Dayoan
*Assistant Examiner* — Melissa A Black
(74) *Attorney, Agent, or Firm* — Carrier Blackman & Associates, P.C.; Joseph P. Carrier; Anne G. Sabourin

(57) ABSTRACT

A vehicle seat housing apparatus wherein a seat is swung back from a seatable position by a support mechanism and housed in a housing recess part such that the bottom is oriented upward, the housing recess part is formed on the floor behind the seat. The support mechanism includes a first support member, a second support member, a coupling shaft, and a folding mechanism. The first support member extends from either the floor or the housing recess part. The second support member extends from the bottom surface of the seat to the first support member. The coupling shaft couples the second support member to the first support member so as to allow back and forth swinging movement. The folding mechanism, when the seat is housed in the housing recess part, folds the first and second support members in a direction eliminating protrusion to the passenger compartment from the floor.

3 Claims, 16 Drawing Sheets

(56) References Cited

U.S. PATENT DOCUMENTS

| | | |
|---|---|---|
| 2001/0026075 A1 | 10/2001 | Shimizu et al. |
| 2003/0094830 A1 | 5/2003 | Kamida et al. |
| 2008/0150312 A1 | 6/2008 | Lehr et al. |
| 2008/0150339 A1 * | 6/2008 | Lehr ............... B60N 2/0232 297/362 |
| 2009/0189408 A1 | 7/2009 | DeVoss et al. |

FOREIGN PATENT DOCUMENTS

| | | |
|---|---|---|
| JP | 11-217034 A | 8/1999 |
| JP | 2003-212017 A | 7/2003 |
| JP | 3626160 B2 | 3/2005 |
| JP | 4314714 B2 | 8/2009 |
| JP | 4586672 B2 | 11/2010 |

OTHER PUBLICATIONS

Office Action dated Apr. 27, 2015 issued in corresponding Chinese Patent Application 201280010584.X.

* cited by examiner

FIG.5
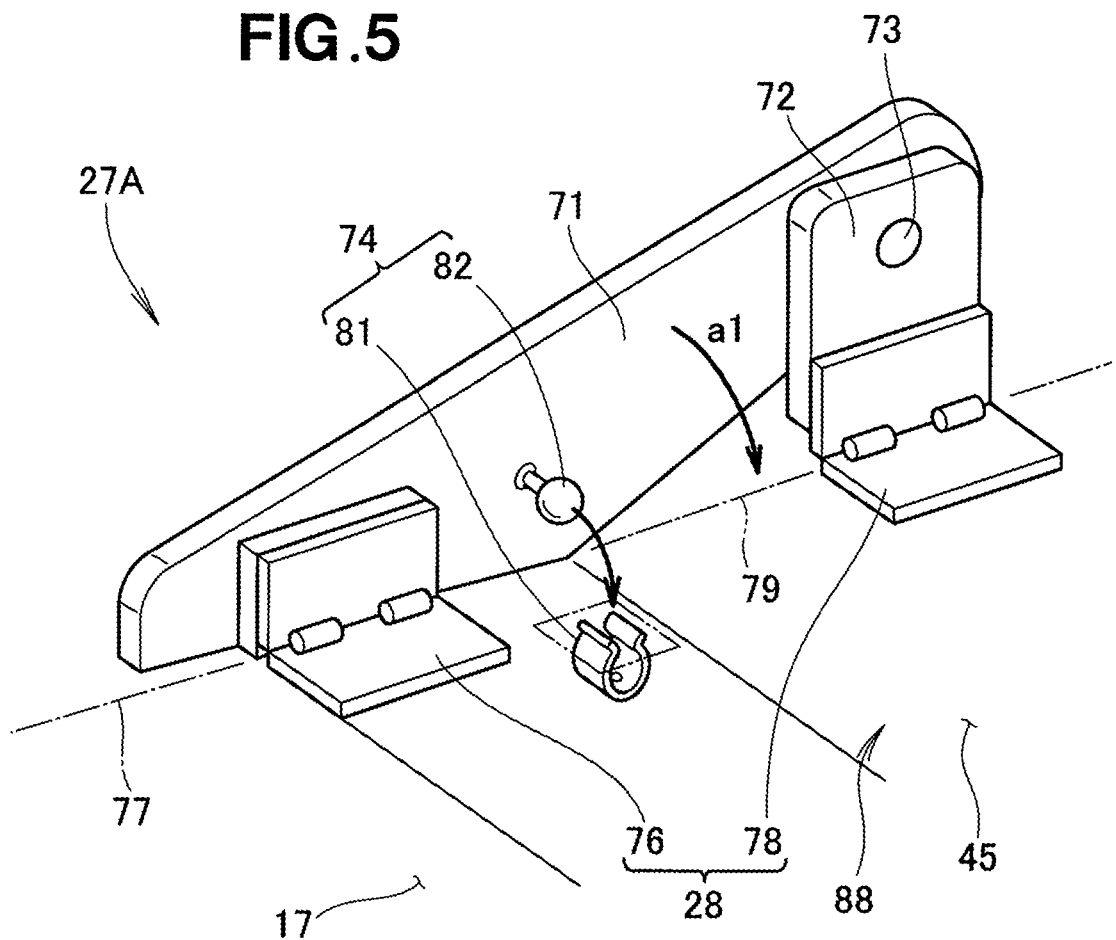
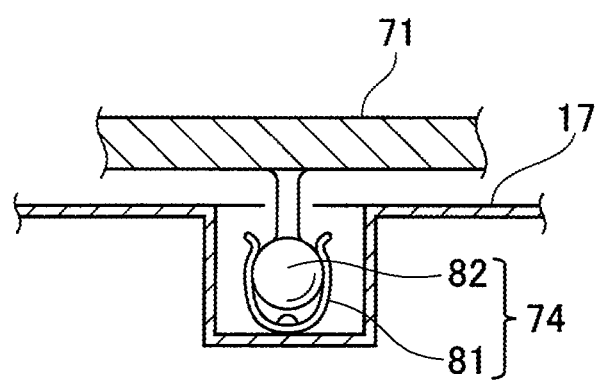
FIG.6

VEHICLE SEAT HOUSING APPARATUS

TECHNICAL FIELD

The present invention relates to a vehicular seat stowing apparatus for moving a seat disposed in a passenger compartment into a stowed position below a floor.

BACKGROUND ART

A vehicular seat stowing apparatus is designed to fold a rearmost row of a seat in a passenger compartment so as to stow the folded seat below a floor. By stowing the rearmost row of the seat below the floor, a space for loading luggage is available in a rear part of a vehicle. A technique for stowing a seat below the floor in that manner is known from patent literature 1. The technique know from patent literature 1 will be discussed below with reference to FIG. 19 and FIG. 20 hereof. FIG. 19 shows a conventional vehicular seat stowing apparatus before stowing a seat. FIG. 20 shows the conventional vehicular seat stowing apparatus after stowing the seat.

As shown in FIG. 19 and FIG. 20, the conventional vehicular seat stowing apparatus 200 includes a stowing recessed portion 203 formed in a floor 202 and located rearwardly of and below a rearmost row of a seat 201. The apparatus 200 also includes a support mechanism 204 supporting the seat 201 to allow the seat 201 in a seatable position to swing into the stowing recessed portion 203. The support mechanism 204 includes a bracket 205 attached to an inside of the stowing recessed portion 203, and a support shaft 207 through which a rear portion of a seat cushion 206 is supported by the bracket 205 in such a manner that the seat cushion 206 swings in a front-and-rear direction of a vehicle. The seat 201 in a folded position can swing rearwardly to be stowed in the stowing recessed portion.

As shown in FIG. 20, the stowed seat 201 has a bottom surface 201a substantially flush with the floor 202 for allowing loading of luggage. The support mechanism 204 is received in the stowing recessed portion 203 without protruding above the floor 202 so that the support mechanism 204 does not hinder luggage from being loaded on a rear part of the vehicle. In order that the support mechanism 204 does not protrude above the floor 202, however, the rear portion of the seat cushion 206 must be disposed lower than the floor 202, as shown in FIG. 19. This is disadvantageous in terms of enhancing a degree of freedom to design the seat 201 and the support mechanism 204.

A height Hi of the seat 201 from the floor 202 and a positional relationship between the seat 201 and the stowing recessed portion 203 vary depending upon a type of the vehicle. When the height Hi of the seat 201 from the floor 202 is large, the support shaft 207 supporting the rear portion of the seat cushion 206 has a large height. In this case, the support mechanism 204 protrudes above the floor 202 when the seat 201 is stowed in the stowing recessed portion 203. To address this problem with the protrusion of the support mechanism 204, a great change must be made to a shape and size of the support mechanism 204 as well as to positioning of the support mechanism 204 relative to the seat 201 and the stowing recessed portion 203. That is, there is a room to enhance a degree of freedom to design the support mechanism 204.

PRIOR ART LITERATURE

Patent Literature

Patent Literature 1: JP-A-2003-212017

SUMMARY OF INVENTION

Technical Problem

It is an object of the present invention is to provide a technique for enhancing a degree of freedom to design a support mechanism swingably supporting a seat as well as for minimizing upward protrusion of the support mechanism from a floor.

Solution to Problem

According to one aspect of the present invention, as defined in claim 1, there is provided a vehicular seat stowing apparatus comprising a stowing recessed portion formed in a floor and disposed rearwardly of and below a seat located in a seatable position within a passenger compartment, and a support mechanism supporting the seat to allow the seat to swing rearwardly from the seatable position into the stowing recessed portion for stowing the seat in the stowing recessed portion with a bottom surface of the seat facing upwardly, wherein the support mechanism comprises: a first support member extending from either the floor or the stowing recessed portion above the floor; a second support member extending from the bottom surface of the seat to the first support member; a connection shaft connecting the second support member to the first support member to allow the second support member to swing in a front-and-rear direction of a vehicle; and a folding mechanism for folding the first support member and the second support member in such a direction that the first support member and the second support member do not protrude from the floor into the passenger compartment when the seat is stowed in the stowing recessed portion.

Preferably, as defined in claim 2, the first support member and the second support member are folded by the folding mechanism in such a direction as to lie along the floor.

Preferably, as defined in claim 3, the folding mechanism comprises: a first hinge foldably connecting the first support member to the floor; and a second hinge foldably connecting the second support member to the bottom surface of the seat, wherein the second hinge is located such that the second hinge has a hinge centerline aligned with a hinge centerline of the first hinge when the seat is stowed in the stowing recessed portion.

Preferably, as defined in claim 4, the first support member and the second support member are folded by the folding mechanism in such a direction as to lie below the floor.

Preferably, as defined in claim 5, the folding mechanism comprises: a first support shaft supporting one end portion of the first support member to allow the first support member to swing in the front-and-rear direction of the vehicle relative to either the floor or the stowing recessed portion; and a second support shaft supporting one end portion of the second support member to allow the second support member to swing in the front-and-rear direction of the vehicle relative to the bottom surface of the seat, wherein the second support shaft is concentric with the first support shaft when the seat is stowed in the stowing recessed portion.

Preferably, as defined in claim 6, the apparatus further comprises a locking device for locking the first support member and the second support member in folded positions when the seat is stowed in the stowing recessed portion.

Advantageous Effects of Invention

As defined in claim 1, the support mechanism swingably supporting the seat includes the first support member extending from either the floor or the stowing recessed portion above the floor, the second support member extending from the bottom surface of the seat to the first support member, and the connection shaft connecting the second support member to the first support member to allow the second support member to swing. By merely setting appropriate points of connection of the second support member to the first support member in correspondence to a height of the seat from the floor, it becomes possible to freely set a range over which the seat supported by the support mechanism swings.

In addition, the support mechanism includes the folding mechanism for folding the first and second support members in such a direction that the first and second support members do not protrude from the floor into the passenger compartment when the seat is stowed in the stowing recessed portion. That is, through an easy operation of merely folding the first and second support members after the seat is stowed in the stowing recessed portion, it becomes possible to prevent the first and second support members from protruding from the floor into the passenger compartment, regardless of appropriately set lengths of the first and second support members.

Thus, it becomes possible to minimize upward protrusion of the support mechanism from the floor and enhance a degree of freedom to design the support mechanism. Since the support mechanism does not protrude upwardly from the floor or an amount of the protrusion of the support mechanism is restrained as much as possible when the seat is stowed in the stowing recessed portion with the bottom surface facing upwardly, an upper side of the floor can be substantially flat. Thus, the seat and the support mechanism do not become obstacles when luggage is loaded onto a rear part of the vehicle. The luggage can be easily loaded on the rear part of the vehicle.

As defined in claim 2, the first and second support members are folded by the folding mechanism in such a direction as to lie along the floor. As a result, the amount of the upward protrusion of the support mechanism from the floor is restrained as much as possible.

As defined in claim 3, the folding mechanism is configured such that when the rear seat is stowed in the stowing recessed portion, the hinge centerline of the second hinge is aligned with the hinge centerline of the first hinge. The first hinge and the second hinge can be folded along the hinge centerlines in the same direction so as to lie along the floor. A simple operation of merely folding the first and second support members in such a direction as to lay the first and second support members along the floor makes it possible to minimize the amount of upward protrusion of the support mechanism from the floor. The folding mechanism can be achieved in simple form made by the first hinge foldably connecting the first support member to the floor, and the second hinge foldably connecting the second support member to the bottom surface of the seat.

As defined in claim 4, the first and second support members are folded by the folding mechanism in such a direction as to lie below the floor. That is, the support mechanism does not protrude upwardly from the floor.

As defined in claim 5, the folding mechanism includes the first support shaft supporting the one end portion of the first support member to allow the first support member to swing in the front-and-rear direction of the vehicle relative to either the floor or the stowing recessed portion, and the second support shaft supporting the one end portion of the second support member to allow the second support member to swing in the front-and-rear direction of the vehicle relative to the bottom surface of the seat. The second support shaft is connected by the connection shaft to the first support member to swing in the front-and-rear direction of the vehicle. Rearward swinging of the second support member on the connection shaft relative to the first support shaft swings the seat rearwardly on the connection shaft for stowing the seat in the stowing recessed portion. When the seat is stowed in the stowing recessed portion, the second support shaft is concentric with the first support shaft. Subsequently, the first and second support members rearwardly swing on the first support shaft into a folded position below the floor. A simple operation of merely folding the first and second support members makes it possible to restrain the support mechanism from protruding upwardly from the floor. The folding mechanism can be achieved in simple form made by the first support shaft and the second support shaft.

As defined in claim 6, the first and second support members are locked in folded positions by the locking device when the seat is stowed in the stowing recessed portion.

BRIEF DESCRIPTION OF DRAWINGS

FIG. 5 is a perspective view of a folding mechanism shown in FIG. 4 and a locking device;

FIG. 6 is a cross-sectional view showing that a locking recessed portion and a locking projection portion which are shown in FIG. 5 interlock;

DESCRIPTION OF EMBODIMENTS

Certain preferred embodiments of the present invention are described below with reference to the accompanying drawings.

Embodiment 1

Figure 1:
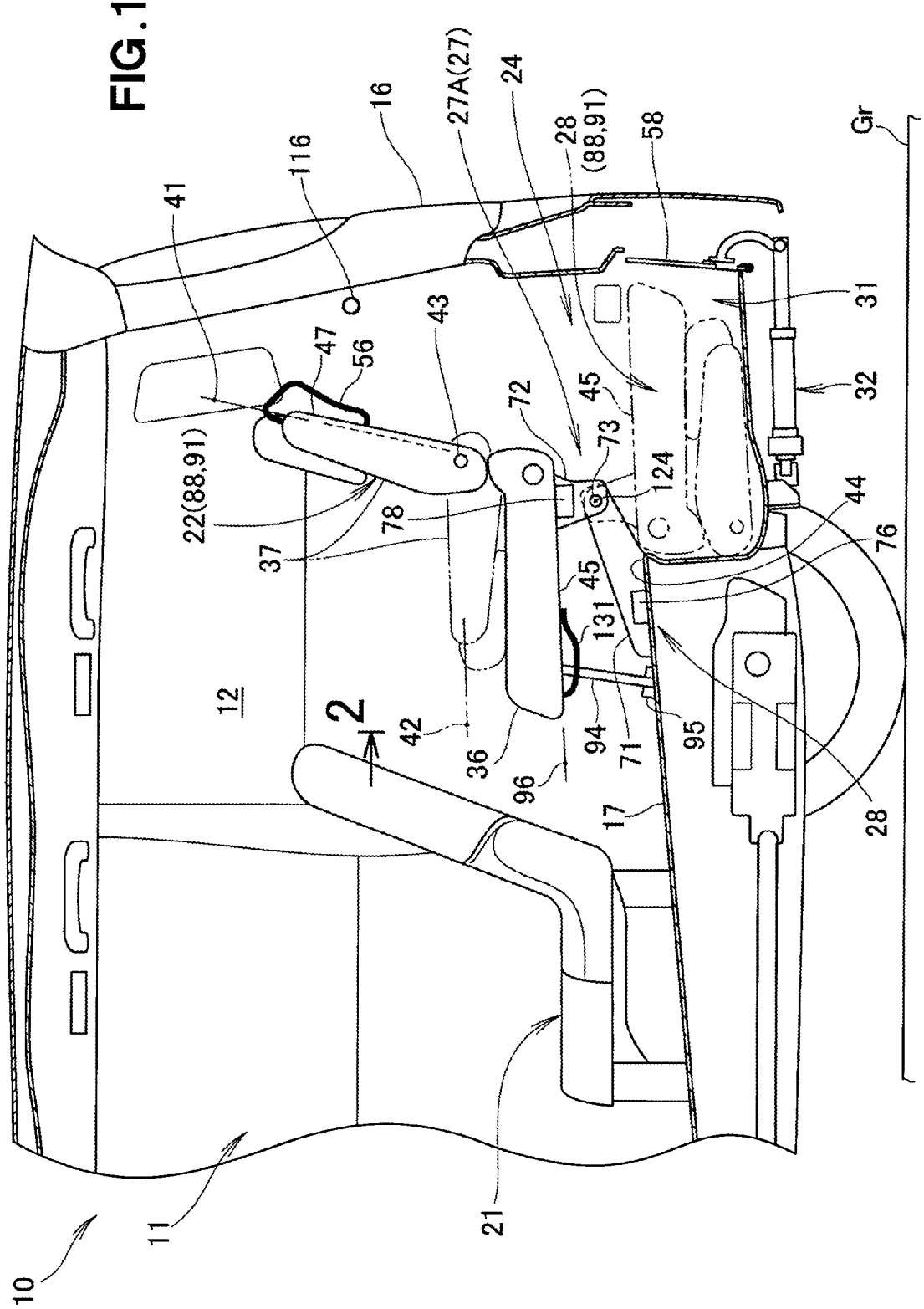
FIG. 1 is a side elevation view of a vehicle having a seat stowing apparatus in a first embodiment of the present invention.

A vehicular seat stowing apparatus in an embodiment 1 will be discussed below with reference to FIG. 1 to FIG. 8. As shown in FIG. 1, a vehicle 10 is a hatchback having a tailgate 16 at a rear side of a vehicle body 11. The vehicle 10 has a passenger compartment 12 within which a front row of a seat (not shown), a second row of a central seat 21, a rearmost row of a rear seat 22, and the seat stowing apparatus 24 are disposed. The front seat, the central seat 21 and the rear seat 22 are located on a floor 17 of the vehicle body 11.

Figure 2:
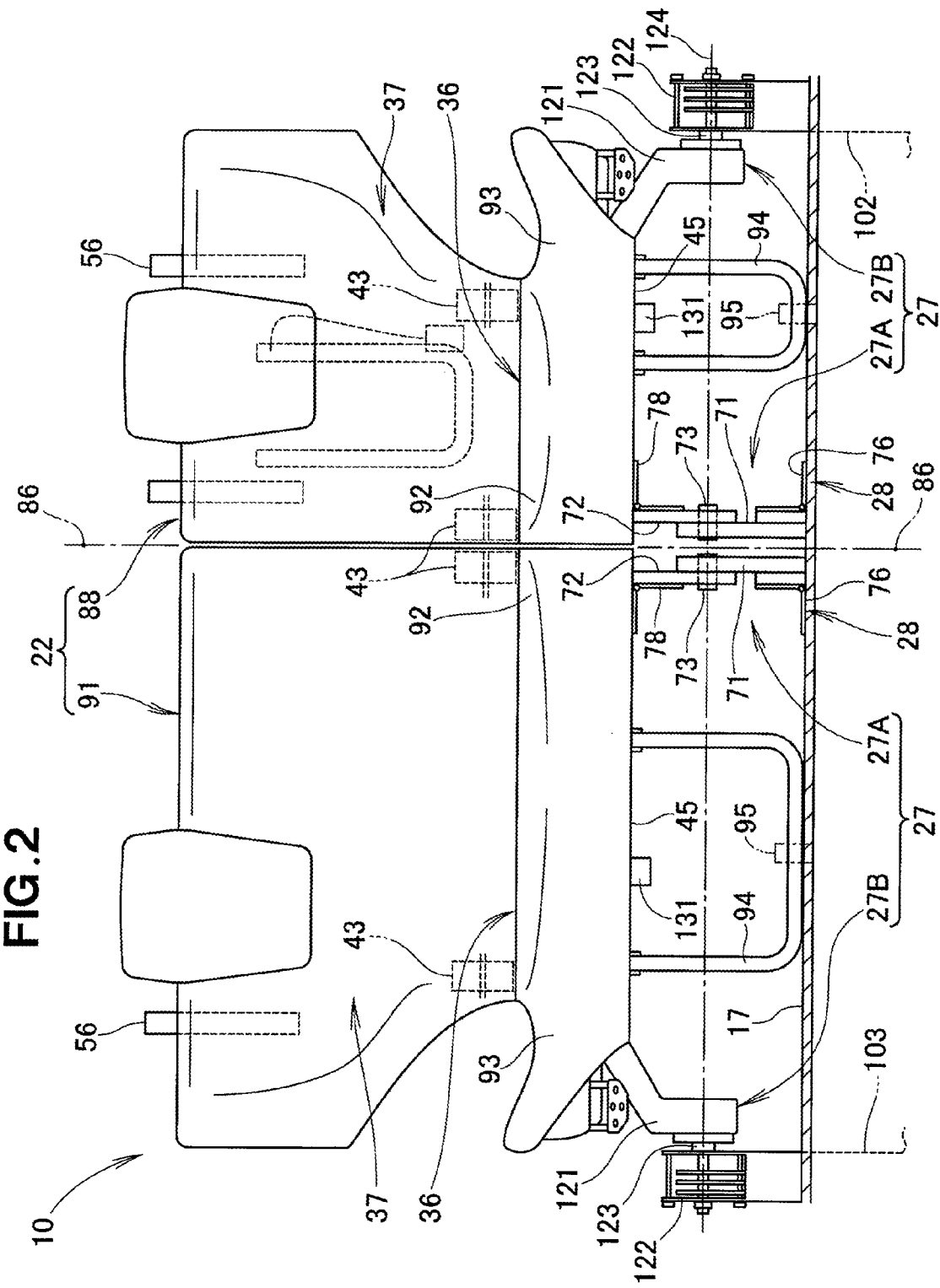
FIG. 2 is a view taken in a direction of an arrow 2 of FIG. 1.

FIG. 2 shows the rear seat 22 as viewed in front elevation. The rear seat 22 is, for example, separated into a left rear seat 88 and a right rear seat 91. The left rear seat 88 has a small width set to allow a single passenger to sit on the left rear seat (which width is about 40% of the overall width of the rear seat 22). The left rear seat 88 includes a seat cushion 36 and a seatback 37. The right rear seat 91 has a large width set to allow two passengers to sit on the right seat 91. The right rear seat 91 includes a seat cushion 36 and a seatback 37. The left and right cushions 36, 36 have their bottom surfaces 45, 45 having the same height from the floor 17. The left rear seat 88 and the right rear seat 91 have a symmetrical relationship to each other except that the seats 88, 91 have the widths different from each other. It is noted that the left rear seat 88 and the right rear seat 91 may have the same width.

As shown in FIG. 1, each of the seatbacks 37, 37 of the left and right rear seats 88, 91 are supported by a reclining device 43 in such a manner as to swing from an upright position 41 to a lying position 42. The upright position 41 is a position in which the seatback 37 is erected on the seat cushion 36 for allowing a passenger to sit on the seat cushion 36. The lying position 42 is a position in which the seatback 37 overlies the seat cushion 36 by folding forwardly onto the seat cushion 36.

The seat stowing apparatus 24 is designed to allow the rear seat 22 to swing from a seatable position to a stowed position in a stowing recessed portion 31 with the bottom surface 45 facing upwardly. The left rear seat 88 and the right rear seat 91 may be stowed separately or simultaneously into the stowing recessed portion 31. As shown in FIG. 1 and FIG. 2, the seat stowing apparatus 24 includes left and right support mechanisms 27, 27 and the stowing recessed portion 31.

The stowing recessed portion 31 is formed in the floor 17 and disposed rearwardly of and below the rear seat 22 located in the seatable position within the passenger compartment 12. The stowing recessed portion 31 has a substantially quadrangular shape as view in plan, and is in the form of open-topped box-shape having a bottom. More specifically, as shown in FIG. 2 and FIG. 3, the stowing recessed portion 31 includes a front wall extending downwardly from a rear end portion 44 of the floor 17, a left sidewall 102 extending rearwardly from a left end of the front wall 101, a right sidewall 103 extending rearwardly from a right end of the front wall 101, a bottom plate 104 extending rearwardly form a lower end of the front wall 101, and a rear wall 58 located on a rear end of the bottom plate 104.

Figure 3:
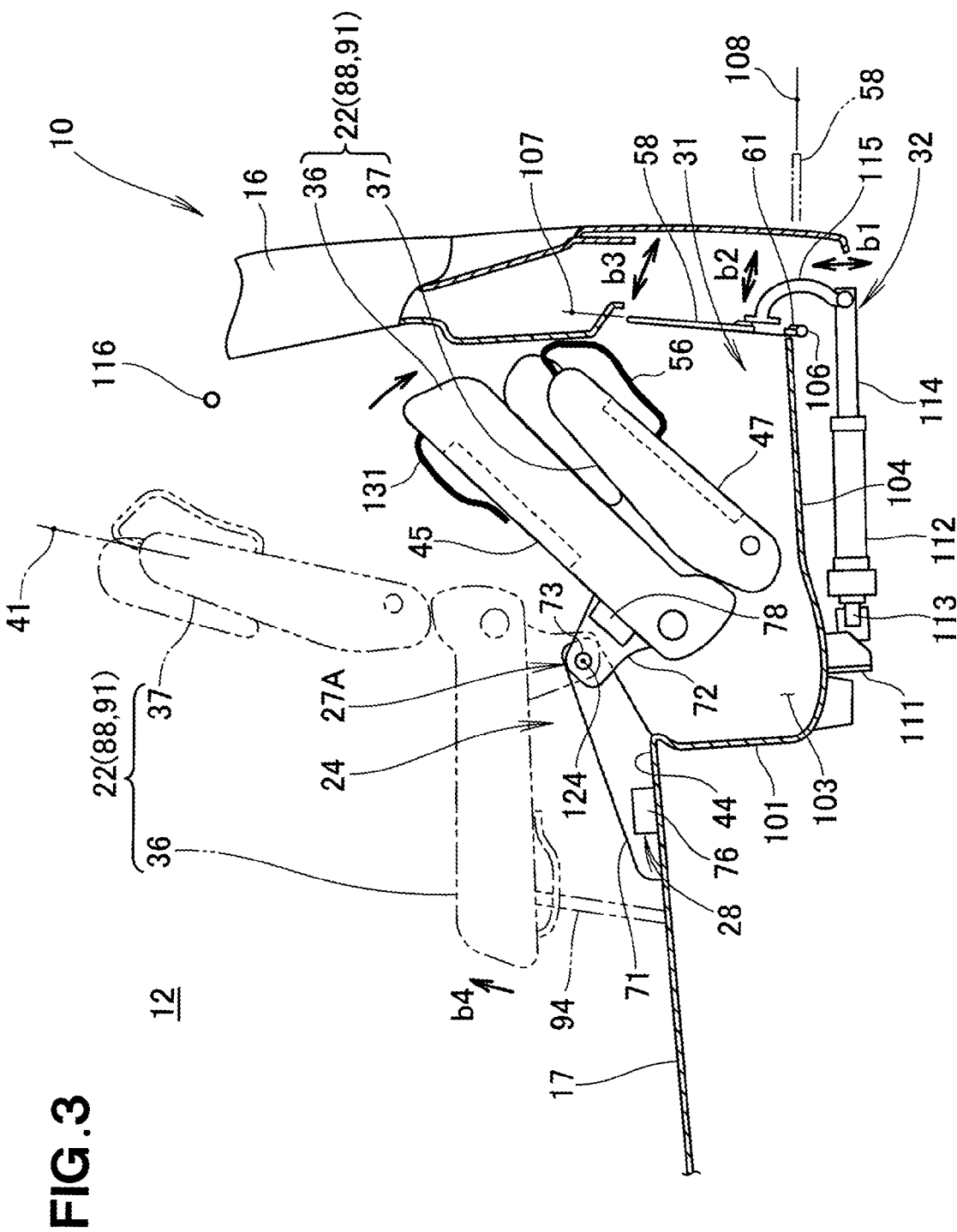
FIG. 3 is a view showing a process of stowing a seat in a stowing recessed portion shown in FIG. 1, the stowing recessed portion being shown in cross-section.

As shown in FIG. 3, a front end of the stowing recessed portion 31, that is, the front wall 101 is located longitudinally centrally of the seat cushion 36. The rear wall 58 has a lower end 61 supported by a pivot 106 located at a rear end of the bottom plate 104 such that the rear wall 58 is openable and closable. The rear wall 58 is driven by a rear wall opening/closing device 32 to move between an upright closed position 107 and a rearward open position 108.

The rear wall opening/closing device 32 includes a connection bracket 111 attached to a back side of the bottom plate 104 of the stowing recessed portion 31, a cylinder 112 connected to the connection bracket 111, an arm 115 connected to a distal end portion of a rod 114 movable into and out of the cylinder 112, and a switch 116 for operating the cylinder 112.

The cylinder 112 is an electrically powered cylinder designed such that the rod 114 (a piston 114) is driven by an electric motor to move into and out of the cylinder 112. The cylinder 112 has a rear end 113 connected to the connection bracket 111 in such a manner as to swing in an up-and-down direction (a direction of an arrow b1) and in a left-and-right direction. The arm 115 has a proximal end connected to the distal end portion of the rod 114 in such a manner as to swing in a front-and-rear direction (a direction of an arrow b2). The arm 115 has a distal end connected to the rear wall 58 in such a manner as to swing in a front-and-rear direction (a direction of an arrow b3). Operation of the switch 116 disposed in a rear part of the passenger compartment 12 activates the rear wall opening/closing device 32 to open and close the rear wall 58.

As shown in FIG. 1 and FIG. 2, the left support mechanism 27 is configured to support the left rear seat 88 to allow the left rear seat 88 to swing from the seatable position into the stowing recessed portion 31. The right support mechanism 27 is configured to support the right rear seat 91 to allow the right rear seat 91 to swing from the seatable position into the stowing recessed portion 31. The left and right support mechanisms 27, 27 are symmetrical about a separation line 86 (FIG. 2) separating the left rear seat 88 from the right rear seat 91.

The left support mechanism 27 will be discussed below. Since the right support mechanism 27 is configured in the same manner as the left support mechanism 27 and have their elements denoted by the same reference numerals as the left support mechanism 27, discussion of the right support mechanism 27 will be omitted. The left support mechanism 27 includes an inner support mechanism 27A and an outer support mechanism 27B. The inner support mechanism 27A is located in a vicinity of a lateral inner end portion 92 of the left seat cushion 36. The outer support mechanism 27B is located in a vicinity of a lateral outer end portion 93 of the left seat cushion 36.

In view of the fact that the inner support mechanism 27A is located near a lateral center of the vehicle 10, the inner support mechanism 27A is foldable such that the inner support mechanism 27A does not become an obstacle with the left rear seat 88 stowed in the stowing recessed portion 31. In contrast, the outer support mechanism 27B is not foldable. This is because the outer support mechanism 27B is located near a lateral outer end of the vehicle 10 and, hence, does not become an obstacle in spite of the fact that the outer support mechanism 27B protrudes from the floor 17 into the passenger compartment 12.

More specifically, as shown in FIG. 1 and FIG. 2, the inner support mechanism 27A includes a first support member 71, a second support member 72, a connection shaft 73 and a folding mechanism 28.

The first support member 71 (a first bracket 71) extends upwardly from the floor 17. The second support member 72 (a second bracket 72) extends from the bottom surface 45 of the left rear seat 88, that is, the bottom surface 45 of the seat cushion 36 to a distal end portion of the first support member 71. The connection shaft 73 (a pivot shaft 73) connects the second support member 72 to the first support member 71 to allow the second support member 72 to swing in the front-and-rear direction of the vehicle 10.

The folding mechanism 28 is configured to fold the first support member 71 and the second support member 72 in such a direction that the first support member 71 and the second support member 72 do not protrude from the floor 17 into the passenger compartment 12 when the left rear seat 88 is stowed in the stowing recessed portion 31. That is, the first support member 71 and the second support member 72 are folded by the folding mechanism 28 in such a direction (a direction of an arrow a1) as to lie along the floor 17.

More specifically, as shown in FIG. 1 and FIG. 2, the folding mechanism 28 includes a first hinge 76 and a second hinge 78. The first hinge 76 and the second hinge 78 are swingable laterally of the vehicle 10. The first hinge 76 foldably connects the first support member 71 to the floor 17. The second hinge 78 foldably connects the second support member 72 to the bottom surface 45 of the rear seat 22.

Figure 4:
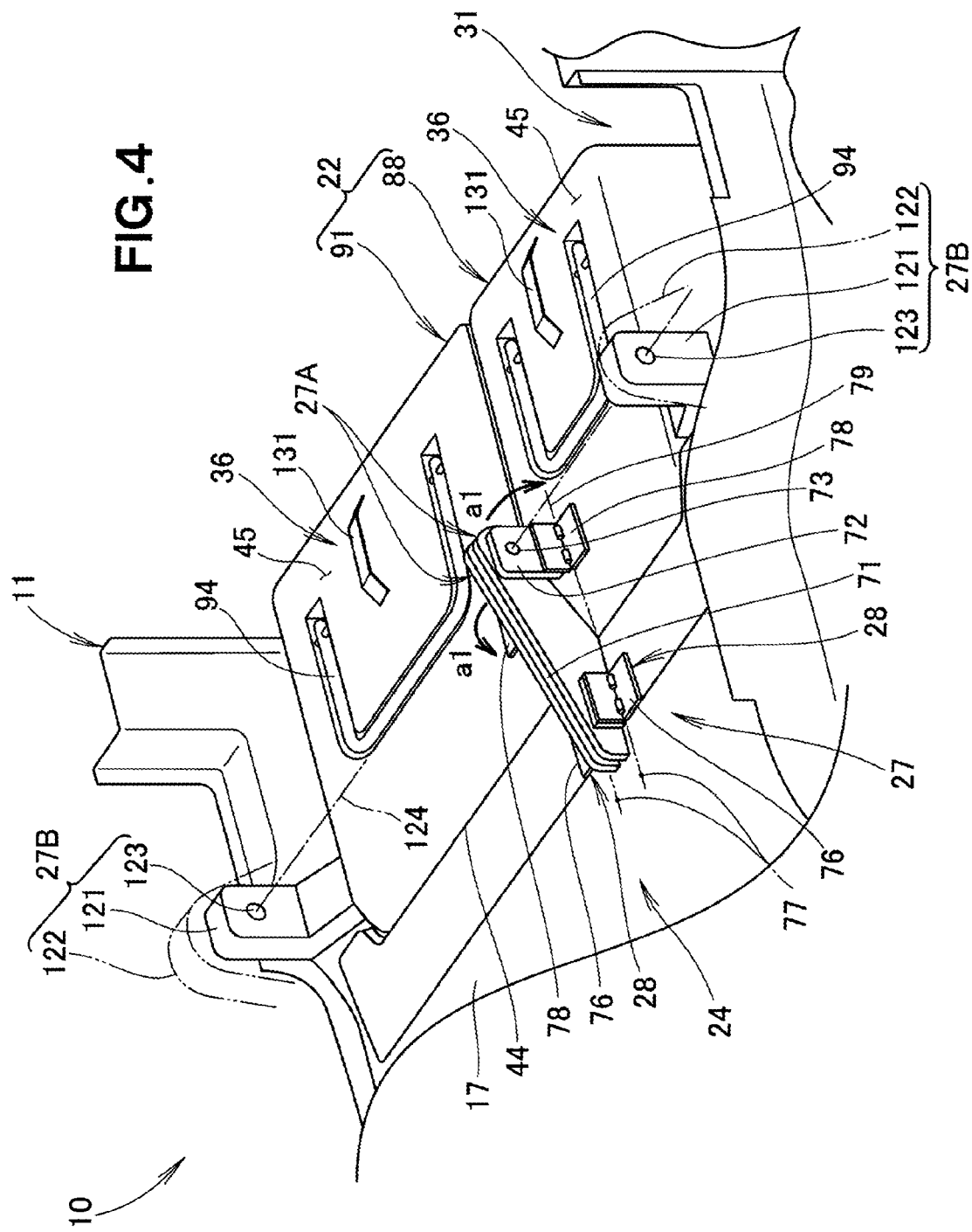
FIG. 4 is a view showing that the seat shown in FIG. 1 is stowed in the stowing recessed portion.

The second hinge 78 is disposed relative to the first hinge 76 as follows. That is, as shown in FIG. 4, the second hinge 78 is disposed in such a position that the second hinge 78 has a hinge centerline 79 (a pivot axis 79) aligned with a hinge centerline 77 (a pivot axis 77) of the first hinge 76 when the left rear seat 88 is stowed in the stowing recessed portion 31.

A detailed description of the inner support mechanism 27A will be made. As shown in FIG. 1 and FIG. 2, the first support member 71 is an elongated plate extending in the front-and-rear direction of the vehicle body 11. The first support member 71 has a front end portion located on the floor 17 in a vicinity of a front end of the stowing recessed portion 31. The front end portion of the first support member 71 is attached to an upper surface of the floor 17 by means of the first hinge 76 to swing laterally outwardly of the vehicle 10 (in the direction of the arrow a1 shown in FIG. 4). From the front end portion attached to the first hinge 76, the first support member 71 extends upwardly and rearwardly of the vehicle body 11, that is, toward the bottom surface 45 and a vicinity of a rear end of the seat cushion 36.

The second support member 72 is a plate disposed in the same orientation as the first support member 71 and is located on the bottom surface 45 in the vicinity of the rear end of the seat cushion 36. The second support member 72 is attached to the bottom surface 45 by means of the second hinge 78 to swing laterally outwardly of the vehicle 10 (in the direction of the arrow a1 shown in FIG. 4). The second support member 72 has a lower end portion overlapping a lateral outer surface of a rear end portion of the first support member 71 and is connected to the lateral outer surface of the rear end portion of the first support member 71 through the connection shaft 73 to swing in the front-and-rear direction of the vehicle 10.

As shown in FIG. 5, the inner support mechanism 27A includes a locking device 74. The locking device 74 is configured to lock the first and second support members 71, 72 in a folded position (FIG. 7) when the left rear seat 88 is stowed in the stowing recessed portion 31. The locking device 74 includes a locking recessed portion 81 disposed on the floor 17 and a locking projection portion 82 disposed on a lateral surface of the first support member 71.

The locking recessed portion 81 is a substantially U-shaped resilient member. The locking projection portion 82 is a substantially ball-shaped member to snap-fit into the locking recessed portion 81, as shown in FIG. 6, when the first and second support members 71, 72 are folded in such a direction (the direction of the arrow a1) as to lie along the floor 17. The locking projection portion 82 can be released from the locking recessed portion 81 by erecting the folded first and second support members 71, 72 by a man power.

As shown in FIG. 2, the outer support mechanism 27B includes an arm 121 and a supporting portion 122. The arm 121 is an inverted-L-shaped member extending laterally outwardly of the vehicle 10 and downwardly from the lateral outer end portion 93 of the seat cushion 36. The arm 121 has a distal end portion carrying a shaft 123 extending laterally outwardly of the vehicle 10. The supporting portion 122 is disposed on the vehicle body 11 and supports the shaft 123 in such a manner as to allow the shaft 123 to rotate in the front-and-rear direction of the vehicle body 11. An axis of rotation of the shaft 123 is aligned with a straight line 124 (an axial centerline 124) passing laterally of the vehicle 10 through a center of the connection shaft 73 of the inner support mechanism 27A.

As shown in FIGS. 2-4, the seat cushion 36 has a front end portion supported on the floor 17 through a leg 94. The leg 94 is foldably attached to the bottom surface 45 of the seat cushion 36. That is, the leg 94 is swingable between an erect position shown in FIG. 2 and a stored position shown in FIG. 4.

As shown in FIG. 1 and FIG. 2, the seatback 37 has a back surface 47 carrying a rear strap 56. The bottom surface 45 of the seat cushion 36 carries a front strap 131. The reclining device 43 is configured to make the seatback 37 free in response to pulling on the rear strap 56 or the front strap 131.

The leg 94 in the erect position is locked on the floor 17 or one part of the vehicle body 11 by a latch 95. The latch 95 is configured to unlock the leg 95 in response to the pulling on the rear strap 56 or the front strap 131. By unlocking the leg 95, the left rear seat 88 is able to swing rearwardly.

An operator within the passenger compartment 12 stows the left rear seat 88 into the stowing recessed portion 31 through a sequence of operations discussed below. Initially, as shown in FIG. 1, the left rear seat 88 is in the seatable position in which the seatback 37 is erected on the seat cushion 36.

At first, the operator pulls the front strap 131. As a result, the reclining device 43 makes the seatback 37 free. The operator folds the seatback 37 forwardly from the upright position 41 onto the seat cushion 36. By the operator's pulling on the front strap 131, the latch 95 unlocks the leg 94.

Next, the operator continues lifting the seat cushion 36 up, as shown by an arrow b4 in FIG. 3. The left rear seat 88 with the seatback 37 overlying the seat cushion 36 swings rearwardly on the axial centerline 124. When a center of gravity of the left rear seat 88 shifts rearwardly beyond the axial centerline 124, the left rear seat 88 swings rearwardly and downwardly under its own weight. Thereafter, the left rear seat 88 is stowed into the stowing recessed portion 31 with the bottom surface 45 facing upwardly. In so doing, the operator can adjust a lowering speed of the front strap 13, holding the front strap 131, thereby adjusting a speed of the rearward and downward swinging of the left rear seat 88.

As shown in FIG. 4, the bottom surface 45 lies flat and is substantially flush with the floor 17 when the left rear seat 88 is stowed in the stowing recessed portion 31. In this state, the tailgate 16 (FIG. 3) can be opened and luggage can be easily loaded onto the floor 17 and the bottom surface 45 from behind the vehicle 10. In addition, it becomes possible to go to or out from the floor 17 and the bottom surface 45 through a rear part of the vehicle 10.

When the left rear seat 88 is stowed in the stowing recessed portion 31, the hinge centerline 79 of the second hinge 78 is aligned with the hinge centerline 77 of the first hinge 76. The operator can fold the first and second support members 71, 72 in such a direction (the direction of the arrow a1) as to lay the first and second support members 71, 72 along the floor 17.

Figure 7:
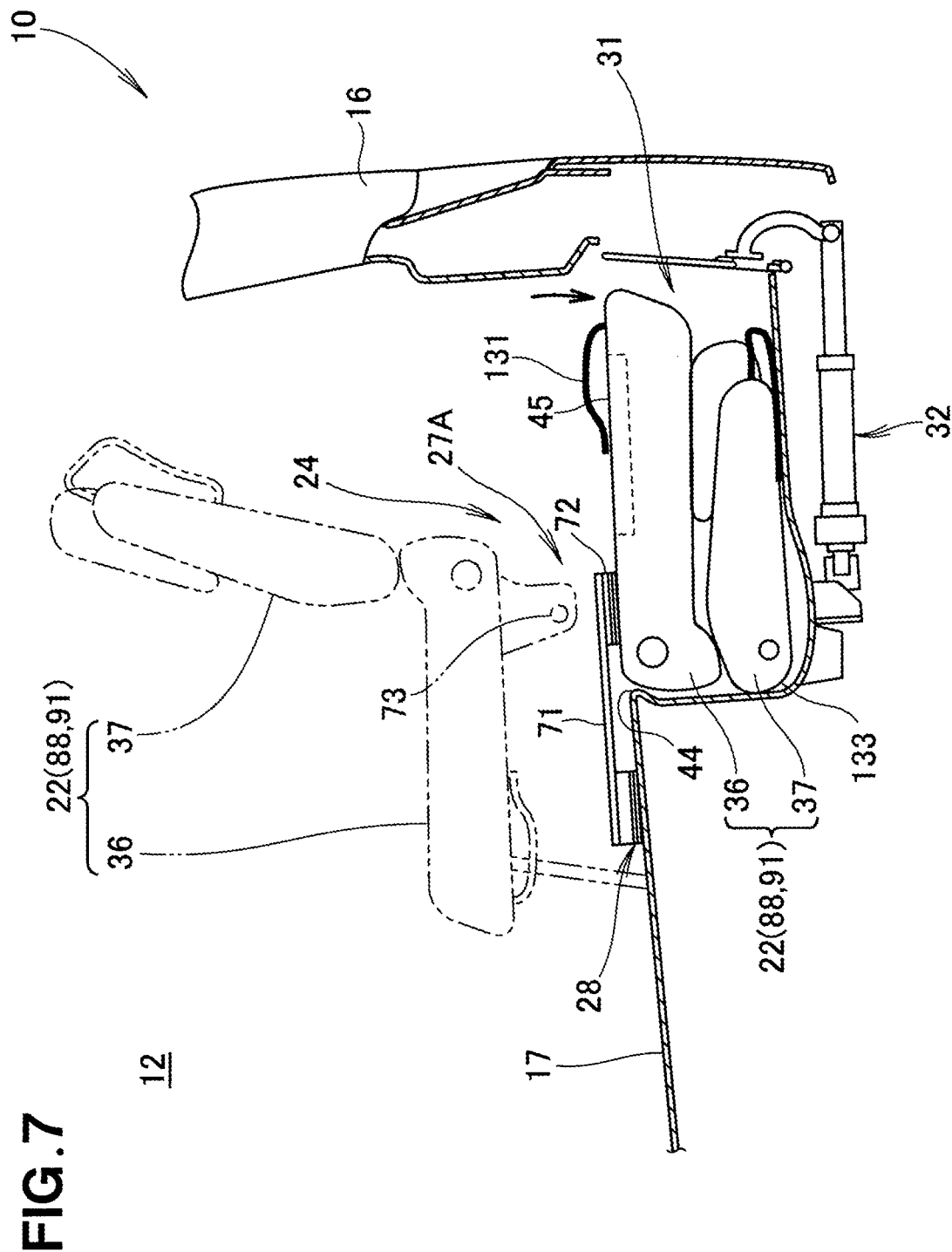
FIG. 7 is a cross-sectional view showing that the seat shown in FIG. 4 is stowed in the stowing recessed portion.

The folded position of the first and second support members 71, 72 is shown in FIG. 7. By folding the first and second support members 71, 72 down, the first hinge 76 and the second hinge 78 are folded along the hinge centerlines 77, 79 (FIG. 4) in the same direction so as to lie along the floor 17. That is, the first and second support members 71, 72 are folded by the folding mechanism 28 in such a direction as to lie along the floor 17.

When the first and second support members 71, 72 are folded, the locking projection portion 82 automatically snap-fits into the locking recessed portion 81, as shown in FIG. 6. That is, the locking device 74 automatically locks the first and second support members 71, 72 in the folded position.

Such a simple operation of merely folding the first and second support members 71, 72 in such a direction as to lay the first and second support members 71, 72 along the floor 17 makes it possible to minimize an amount of upward protrusion of the inner support mechanism 27A from the floor 17. Thus, the inner support mechanism 27A located near the lateral center of the vehicle 10 does not become an obstacle when luggage is easily loaded onto the floor 17 and the bottom surface 45.

As shown in FIG. 4, the outer support mechanism 27B is located near the lateral outer end of the vehicle 10. Also, the arm 121 of the outer support mechanism 27B is turned from the inverted-L-shaped posture (FIG. 2) to a substantially L-shaped posture when the left rear seat 88 is stowed in the stowing recessed portion 31. This means that it does not become an obstacle in spite of protruding from the floor 17 into the passenger compartment 12.

Thereafter, as shown in FIG. 3, the switch 116 of the rear wall opening/closing device 32 is operated to thereby bring the rod 114 to an extended position for moving the rear wall 58 to the rearward open position 108. The rear wall 58 is held in the rearward open position 108. As a result, the rear wall 58 serves as a step located between the bottom surface 45 of the left rear seat 88 and a ground surface Gr (FIG. 1). This step makes it easier to get in the passenger compartment 12 from behind the vehicle 10. The rear wall 58 is then returned from the rearward open position 108 to the initial upright closed position 107 by again operating the switch 116.

The operator within the passenger compartment 12 performs the following sequence of operations for returning the left rear seat 88 stowed in the stowing recessed portion 31, shown in FIG. 7, into the initial seatable position shown in a phantom line of FIG. 7. At first, the first and second support members 71, 72 folded are erected, whereupon the locking projection portion 82 shown in FIG. 6 is released from the locking recessed portion 81. Next, the front strap 131 is pulled up. As a result, the left rear seat 88 is returned to the initial seatable position shown in the phantom line.

An operator outside the vehicle 10 stows the left rear seat 88 into the stowing recessed portion 31 through a sequence of operations discussed below. Initially, as shown in FIG. 1, the left rear seat 88 is in the seatable position in which the seatback 37 is erected on the seat cushion 36.

At first, the operator opens the tailgate 16 from outside the vehicle 10 and pulls the rear strap 56 rearwardly. As a result, the reclining device 43 makes the seatback 37 free and the latch 95 unlocks the leg 94. A further rearward pulling on the rear strap 56 causes the seat cushion 36 to swing rearwardly relative to the seatback 37, whereby the left rear seat 88 is folded with the seat cushion 36 and the seatback 37 overlapping.

Figure 8:
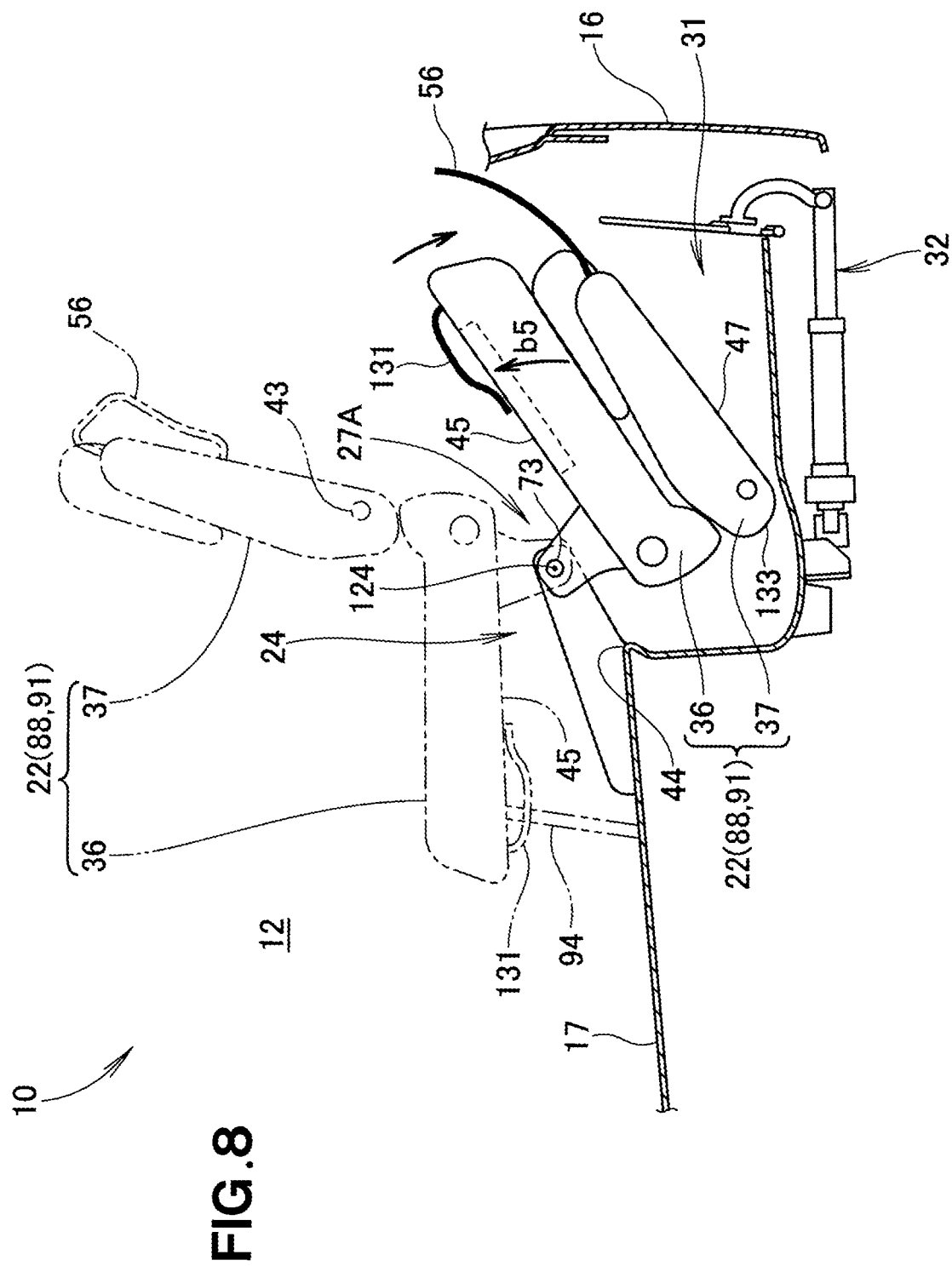
FIG. 8 is a view showing a process of stowing the seat shown in FIG. 1 from behind the vehicle.

When the operator still further pulls the rear strap 56 rearwardly, the folded, left rear seat 88 rearwardly swings on the axial centerline 124, as shown by a solid line of FIG. 8. The operator then pushes the left rear seat 88 rearwardly and downwardly into the stowing recessed portion 31, as shown by a solid line of FIG. 7. Finally, the operator folds the first and second support members 71, 72 in such a direction as to lay the first and second support members 71, 72 along the floor 17.

The operator outside the vehicle 10 performs the following sequence of operations for returning the left rear seat 88 stowed in the stowing recessed portion 31, shown in FIG. 7, into the initial seatable position shown by a phantom line.

At first, the operator opens the tailgate 16 from outside the vehicle 10 and erects the folded first and second support members 71, 72, whereupon the locking projection portion 82 shown in FIG. 6 is released from the locking recessed portion 81. Next, the operator pulls up the rear strap 56. As a result, a lower portion 133 of the seatback 37 is lifted up to the same level as the floor 17. Holding his hand onto the lower portion 133 of the seatback 37, subsequently, the operator swings the entire folded, left rear seat 88 shown in FIG. 8 in a forward and upward direction (a direction of an arrow b5). As a result, the left rear seat 88 is returned to the initial seatable position shown by the phantom line.

The description of the embodiment 1 is summarized as follows. The support mechanisms 27A, 27A for supporting the seats 88, 91 to allow swinging of the seats 88, 91 include the first support members 71, 71 and the second support members 72, 72, and the connection shafts 73, 73. By merely setting appropriate points of connection of the second support members 72, 72 to the first support members 71, 71 in correspondence to heights of the seats 88, 91 from the floor 17, it becomes possible to freely set a range over which the seats 88, 91 supported by the support mechanisms 27A, 27A swing.

In addition, the support mechanisms 27A, 27A include the folding mechanisms 28, 28 for folding each of the first and second support members 71, 71, 72, 72 in such a direction that the first and second support members 71, 71, 72, 72 do not protrude from the floor 17 into the passenger compartment 12 when the seats 88, 91 are stowed in the stowing recessed portion 31. That is, through an easy operation of merely folding the first and second support members 71, 71, 72, 72 after the seats 88, 91 are stowed in the stowing recessed portion 31, it becomes possible to prevent the first and second support members 71, 71, 72, 72 from protruding from the floor 17 into the passenger compartment 12, regardless of appropriately set lengths of the first and second support members 71, 71, 72, 72.

Thus, it becomes possible to minimize upward protrusion of the support mechanisms 27A, 27A from the floor 17 and enhance a degree of freedom to design the support mechanisms 27A, 27A. Since the support mechanisms 27A, 27A do not protrude upwardly from the floor 17 or amounts of the protrusions of the support mechanisms 27A, 27A are restrained as much as possible when the seats 88, 91 are stowed in the stowing recessed portion 31 with the bottom surfaces 45, 45 facing upwardly, an upper side of the floor 17 can be substantially flat. Thus, the seats 88, 91 and the support mechanisms 27A, 27A do not become obstacles when luggage is loaded onto a rear part of the vehicle 10. The luggage can be easily loaded on the rear part of the vehicle 10.

The folding mechanisms 28, 28 can be achieved in simple form made by the first hinges 76, 76 foldably connecting the first support members 71, 71 to the floor 17, and the second hinges 78, 78 foldably connecting the second support members 72, 72 to the bottom surfaces 45, 45 of the seats 88, 91.

Embodiment 2

A vehicular seat stowing apparatus in an embodiment 2 will be discussed below with reference to FIG. 9 to FIG. 18. The vehicular seat stowing apparatus 150 in the embodiment 2 features an inner support mechanism 160 shown in FIG. 9 to FIG. 17 rather than the inner support mechanism 27A in the embodiment 1 shown in FIG. 1 to FIG. 8. Elements of the apparatus 160 other than the inner support mechanism 160 are the same as those shown in FIG. 1 to FIG. 8, and hence are designated by the same reference numerals and will not be discussed.

Figure 9:
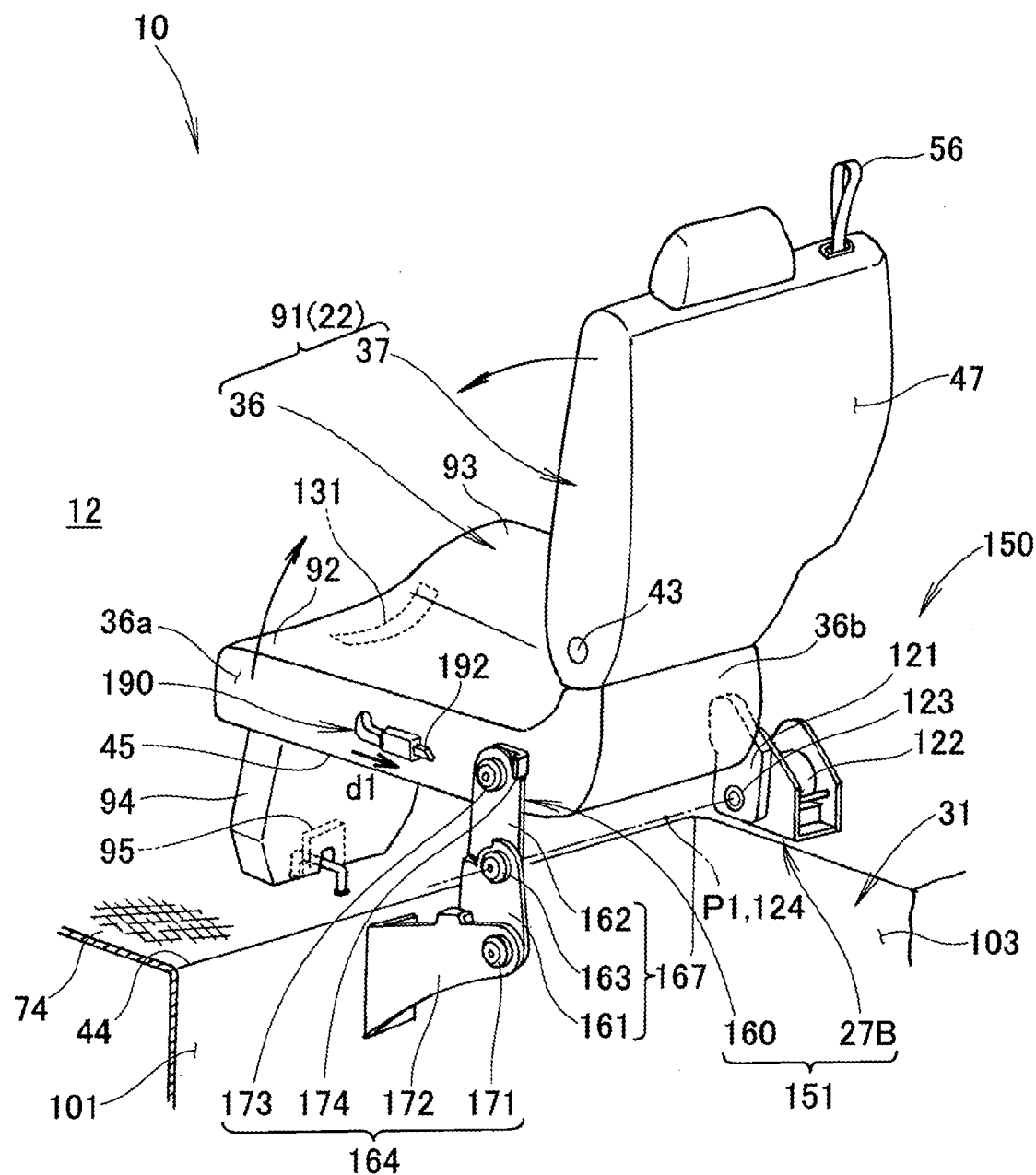
FIG. 9 is a perspective view of a seat and a seat stowing apparatus in a second embodiment of the present invention.

As shown in FIG. 9, the seat stowing apparatus 150 in the embodiment 2 includes left and right support mechanisms 151 (only right one shown) and the stowing recessed portion 31. Only the right support mechanism 151 for supporting the right rear seat 91 will be discussed hereinbelow. The left support mechanism for supporting the left rear seat 88 (FIG. 2) is configured in the same manner as the right support mechanism 151 except that the left support mechanism has a symmetrical relationship to the right support mechanism 151, and hence a description of the left support mechanism will be omitted.

The right support mechanism 151 is configured to support the right rear seat 91 to allow the right rear seat 91 in a seatable position shown in FIG. 9 to swing into the stowing recessed portion 31. The right support mechanism 151 includes the inner support mechanism 160 and the outer support mechanism 27B. The inner support mechanism 160 is located in a vicinity of the lateral inner end 92 of the right seat cushion 36. In view of the fact that the inner support mechanism 160 is located near a lateral center of the vehicle 10, the inner support mechanism 160 is foldable such that the inner support mechanism 160 does not become an obstacle with the right rear seat 91 stowed in the stowing recessed portion 31. The outer support mechanism 27B is configured in the same manner as discussed in the embodiment 1, and is located in a vicinity of the lateral outer end portion 93 of the right seat cushion 36.

Figure 10:
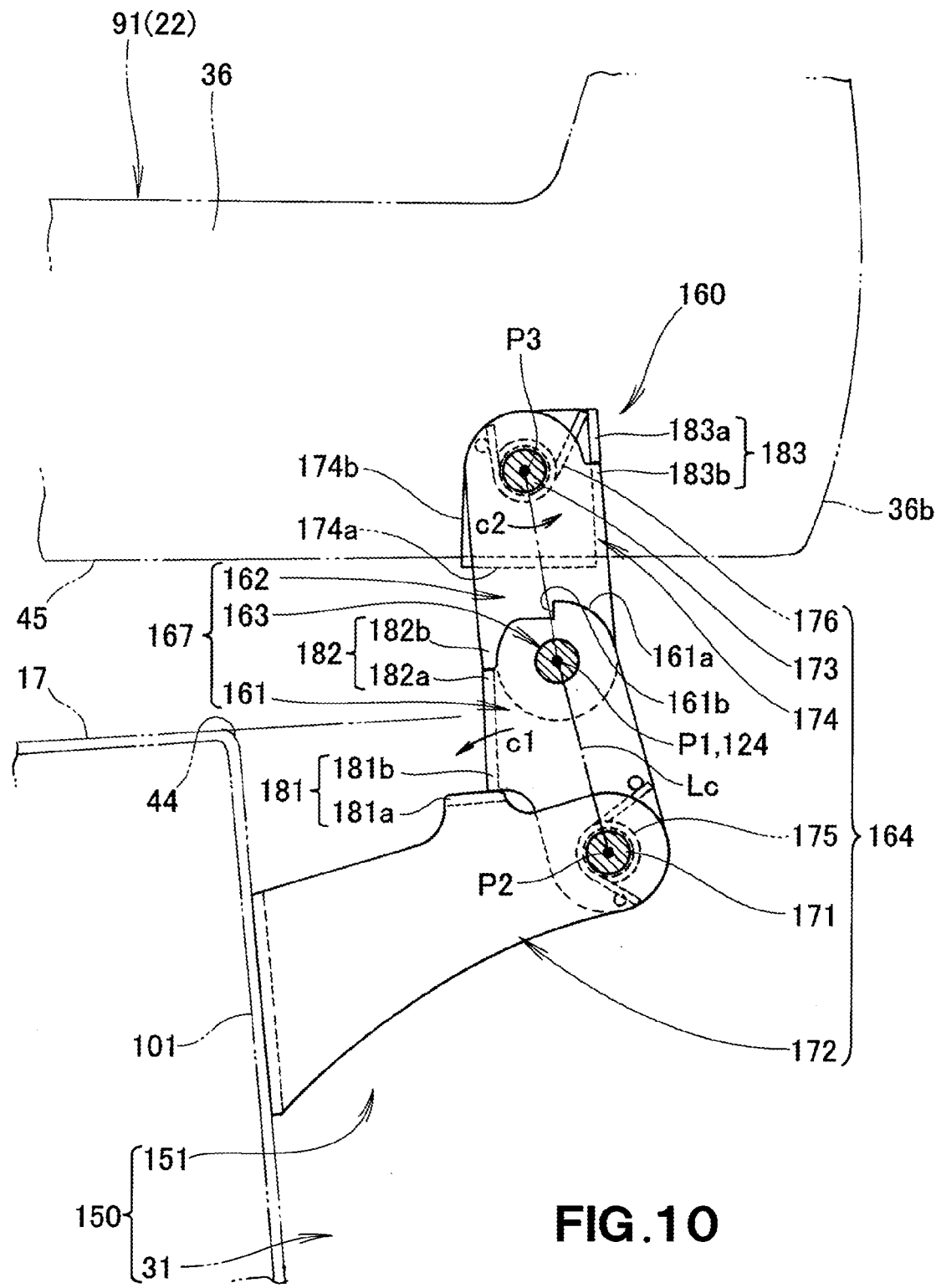
FIG. 10 is a side elevation view of an inner support mechanism and a stowing recessed portion which are shown in FIG. 9.
Figure 11:
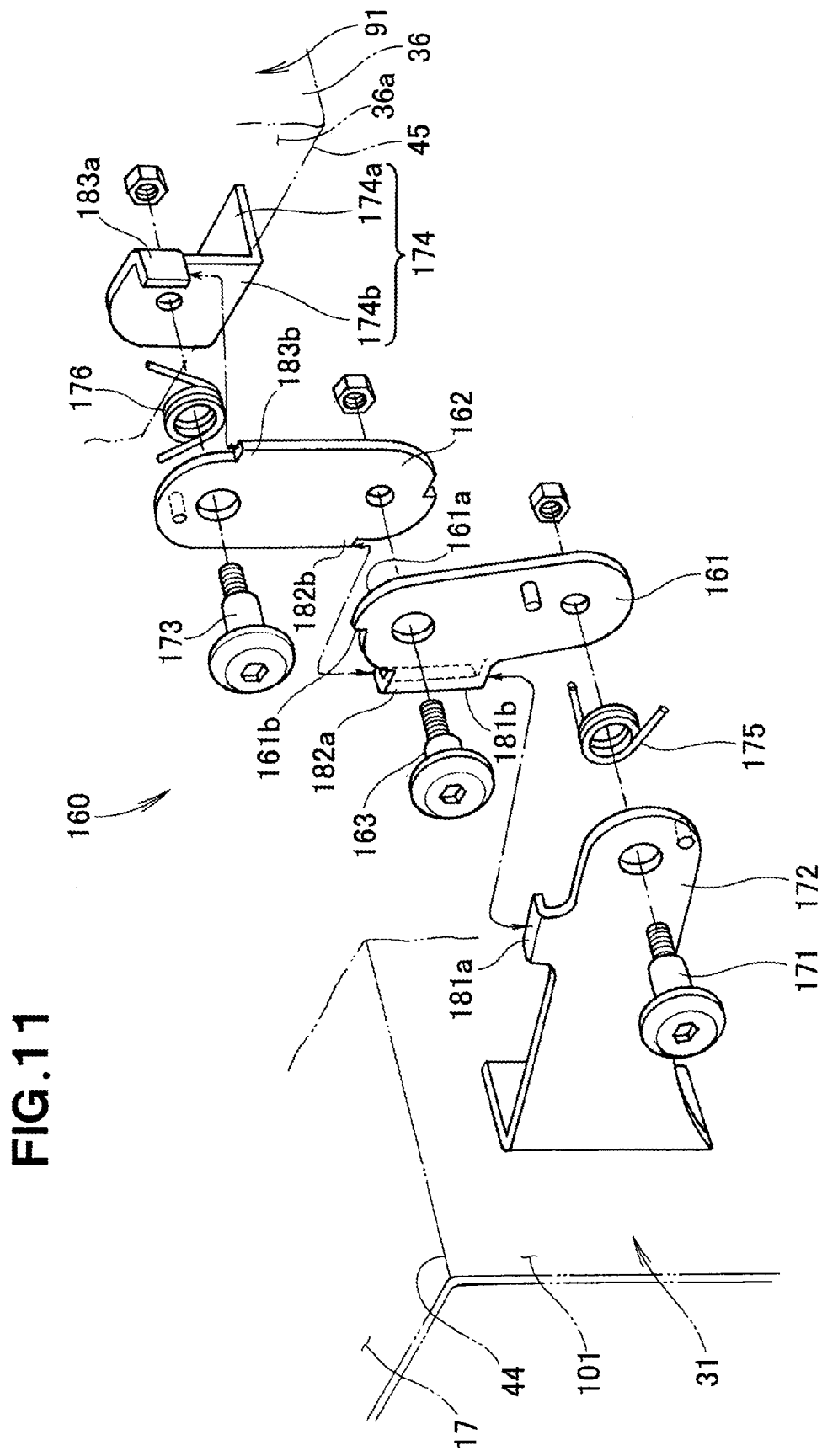
FIG. 11 is an exploded view of the inner support mechanism shown in FIG. 10.

More specifically, as shown in FIG. 9 to FIG. 11, the inner support mechanism 160 includes a first support member 161, a second support member 162, a connection shaft 163, and a folding mechanism 164.

The first support member 161 is an elongated plate member extending upward from the stowing recessed portion 31 above the floor 17. The first support member 161 has a lateral surface facing laterally of the vehicle 10. The second support member 162 is an elongated plate member extending from the bottom surface 45 of the right rear seat 91, that is, the bottom surface 45 of the seat cushion 36 to a distal end portion of the first support member 161. The second support member 162 has a lateral surface facing laterally of the vehicle 10. The lateral surface of the second support member 162 overlaps the first support member 161. The connection shaft 163 (a pivot shaft 163) connects the second support member 162 to the first support member 161 to allow the second support member 162 to swing in the front-and-rear direction of the vehicle 10.

A combination of the first support member 161, the second support member 162 and the connection shaft 163 defines a link mechanism 167. When the right rear seat 91 is in the seatable position, the connection shaft 163 has a center P1 on the straight line 124 (the axial centerline 124) extending laterally of the vehicle 10 through the axis of rotation of the shaft 123, i.e., the center of the shaft 123 of the outer support mechanism 27B.

The folding mechanism 164 is configured to fold the first and second support members 161, 162 in such a direction that the first and second support members 161, 162 do not protrude from the floor 17 into the passenger compartment 12 when the right rear seat 91 is stowed in the stowing recessed portion 31. The first and second support members 161, 162 are folded by the folding mechanism 164 in such a direction as to lie below the floor 17. More specifically, the folding mechanism 164 includes a first support shaft 171, a first bracket 172, a second support shaft 173, a second bracket 174, a first return spring 175 and a second return spring 176.

The first support shaft 171 is a member supporting one end portion (a lower end portion) of the first support member 161 to allow the first support member 161 to swing in the front-and-rear direction of the vehicle 10 relative to a wall portion 101 (the front wall 101) of the stowing recessed portion 31. The first support shaft 171 is located within the stowing recessed portion 31 and may be attached directly to the stowing recessed portion 31. Preferably, the first support shaft 171 is indirectly attached to the stowing recessed portion 31 through the first bracket 172.

The first bracket 172 is located within the stowing recessed portion 31 and extends from the front wall 101 rearwardly of the vehicle body 11. The first bracket 172 has a distal end portion supporting the first support shaft 171.

The second support shaft 173 is a member supporting one end portion (an upper end portion) of the second support member 162 to allow the second support member 162 to swing in the front-and-rear direction of the vehicle 10 relative to the bottom surface 45 of the right rear seat 91. The second support shaft 173 may be attached directly to the bottom surface 45 of the right rear seat 91. Preferably, the second support shaft 173 is indirectly attached to the bottom surface 45 through the second bracket 174.

The second bracket 174 is located at a rear end portion of the right rear seat 91, and is a member which is substantially L-shaped (FIG. 11) when the right rear seat 81 is viewed in front elevation. The second bracket 174 includes a horizontal plate 174a and a vertical plate 174b. The horizontal plate 174a underlies the bottom surface 45 of the right rear seat 91 in overlapping relationship to the bottom surface 45 and is coupled to the bottom surface 45. The vertical plate 174b extends vertically (e.g., upwardly) from the horizontal plate 174a along a lateral inner end surface 36a of the right rear seat cushion 36

The above discussion is summarized as follows. At the distal end portion of the first bracket 172, the lower end portion of the first support member 161 is supported by the first support shaft 171 to swing in the front-and-rear direction of the vehicle 10. At an upper end portion of the first support member 161, a lower end portion of the second support member 162 is supported by the connection shaft 163 to swing in the front-and-rear direction of the vehicle 10. At the upper end portion of the second support member 162, the vertical plate 174b of the second bracket 174 is supported by the second support shaft 173 to swing in the front-and-rear direction of the vehicle 10. The second bracket 174 is attached to the bottom surface 45 of the right rear seat 91.

As shown in FIG. 10, the first support shaft 171, the connection shaft 163, the second support shaft 173 are arranged in an upward direction in this order substantially in alignment with one another. The center P1 of the connection shaft 163 is slightly offset forwardly of the vehicle body 11 relative to a center P2 of the first support shaft 171. The second support shaft 173 has a center P3 slightly offset forwardly of the vehicle body 11 relative to the center P1 of the connection shaft 163. A vertical line Lc passing through the first support shaft 171, the connection shaft 163, and the second support shaft 173 is a substantially straight line slightly slanting forwardly of the vehicle body 11. As a result, a center of gravity of the right rear seat 91 is offset forwardly from the first support shaft 171.

A distance between the center P1 of the connection shaft 163 and the center P2 of the first support shaft 171 is set to be (substantially) equal to a distance between the center P1 of the connection shaft 163 and the center P3 of the second support shaft 173.

A range over which the first support member 161 can swing forwardly of the vehicle body 11 (counterclockwise in FIG. 10, a direction of an arrow c1) relative to the first bracket 172 is determined by a first stopper 181. The first stopper 181 includes a lug 181a formed at a front upper end of the first bracket 172, and a projecting portion 181b formed at a front lower end of the first support member 161.

The first return spring 175 is a member such as a torsion spring urging the first support member 161 in such a direction that the lug 181a and the projecting portion 181b contact each other.

A range over which the second support member 162 can swing forwardly of the vehicle body 11 (counterclockwise in FIG. 10) relative to the first support member 161 is determined by a second stopper 182. The second stopper 182 includes a projecting portion 182a formed at a front upper end of the first support member 161, and a projecting portion 182b formed at a front lower end of the second support member 162.

A range over which the second support member 162 can swing forwardly of the vehicle body 11 (counterclockwise in FIG. 10, a direction of an arrow c2) relative to the second bracket 174 is determined by a third stopper 183. The third stopper 183 includes a lug 183a formed at a rear upper end of the second bracket 174, and a projecting portion 183b formed at a rear upper end of the second support member 162.

The second return spring 176 is a member such as a torsion spring urging the second support member 162 in such a direction that the lug 183a and the projecting portion 183b contact each other.

Figure 12:
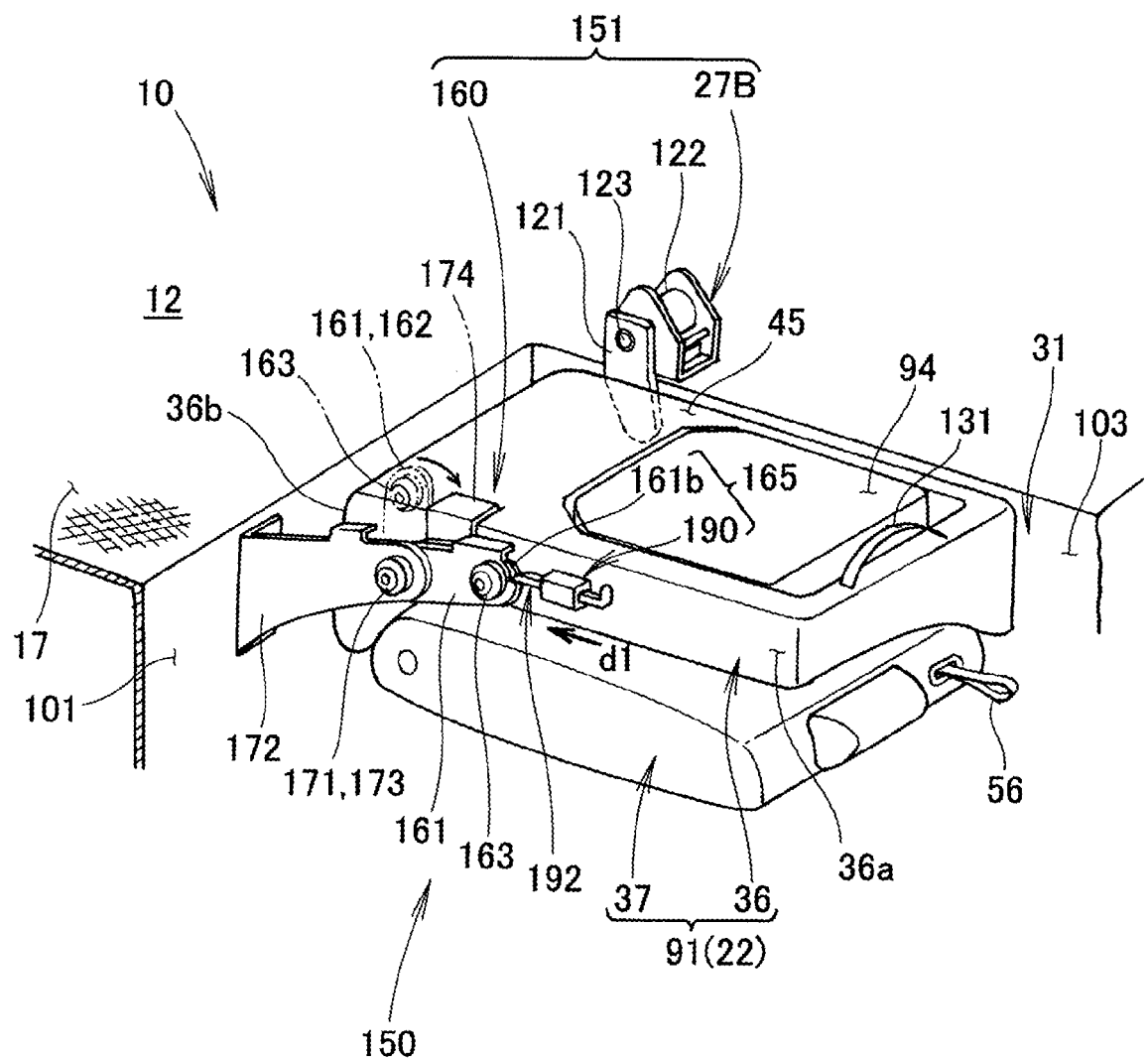
FIG. 12 is a view showing that the seat shown in FIG. 9 is stowed in the stowing recessed portion.
Figure 13:
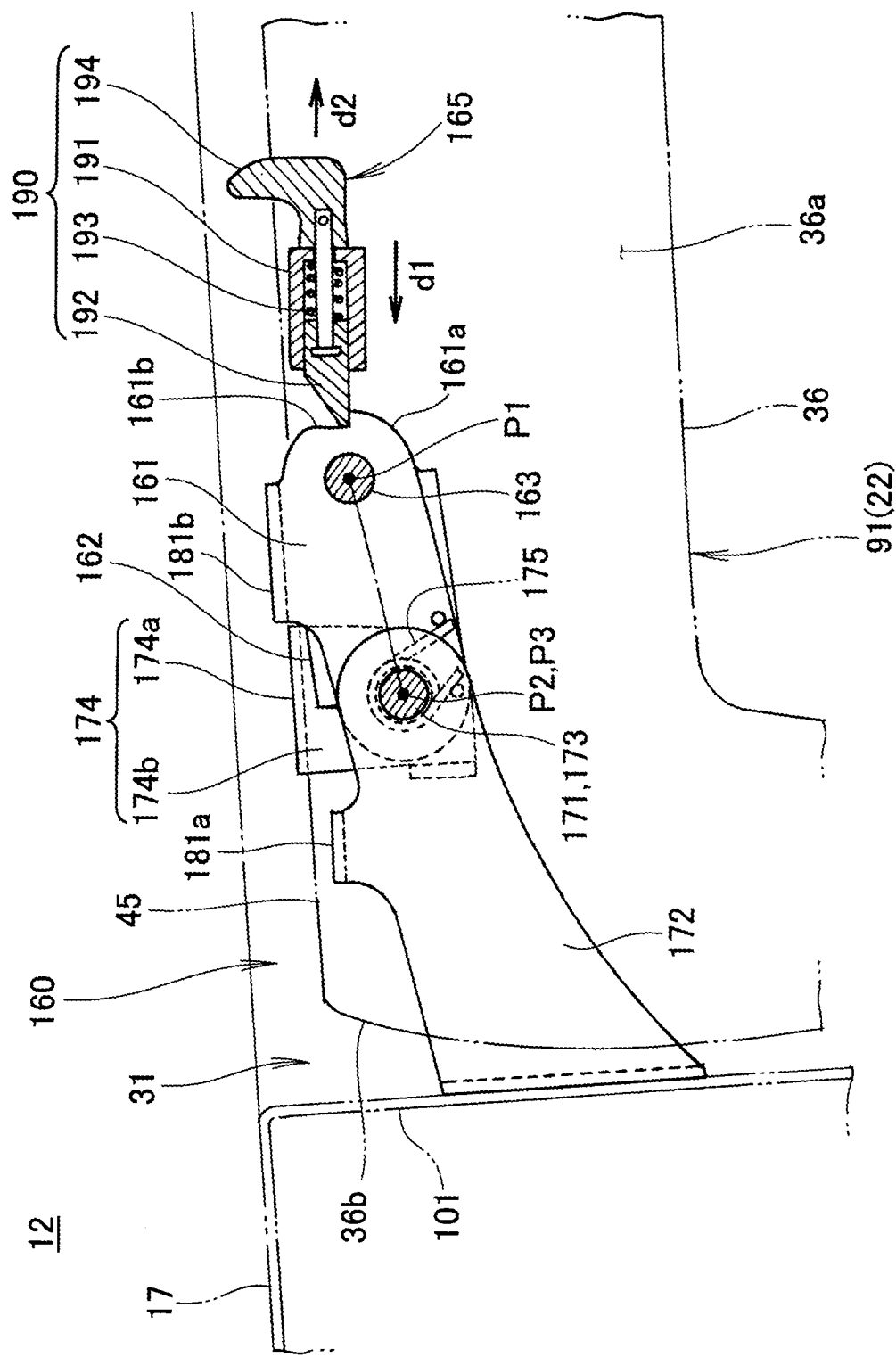
FIG. 13 is a side elevation view of the inner support mechanism and the stowing recessed portion which are shown in FIG. 12.

As shown in FIG. 12 and FIG. 13, the inner support mechanism 160 includes a locking device 165. The locking device 165 is configured to lock the first and second support members 161, 162 in folded positions when the right rear seat 91 is stowed in the stowing recessed portion 31. The locking device 165 includes, for example, a recessed portion 161b formed on a distal end surface 161a of the first support member 161, and a locking portion 190 attached to the inner end surface 36a of the seat cushion 36. The locking portion 190 is provided for locking the recessed portion 161b. As shown in FIG. 13, the distal end surface 161a of the first support member 161 extends in an arc of a true circle having a center defined by the center P1 of the connection shaft 163.

The locking device 190 includes a guide member 191, a slider 192, a return spring 193 and a knob 194. The guide member 191 is attached to the inner end surface 36a of the seat cushion 36. The slider 192 is a member to be guided by the guide member 191 sliding in a front-and-rear direction of the seat cushion 36. The return spring 193 is a member such as a compression spring urging the slider 192 in a direction toward the rear end 36b of the seat cushion 36 (a direction of an arrow d1). The knob 194 is a member to be pulled forwardly of the seat cushion 36 (in a direction of an arrow d2) against an urging force of the return spring 193.

An operator within the passenger compartment 12 stows the right rear seat 91 in the stowing recessed portion 31 through a sequence of operations discussed below. Initially, as shown in FIG. 9, the right rear seat 91 is in the seatable position in which the seatback 37 is erected on the seat cushion 36.

At first, the operator pulls the front strap 131. As a result, the reclining device 43 makes the seatback 37 free. The operator folds the seatback 37 forwardly from the upright position 41 onto the seat cushion 36. By the operator's pulling on the front strap 131, the latch 95 unlocks the leg 94. It is noted that in the embodiment 2, the latch 95 is disposed inside the leg 94.

Next, the operator continues lifting a front portion of the seat cushion 36. The right rear seat 91 with the seatback 37 overlying the seat cushion 36 swings rearwardly on the axial centerline 124 (the center P1 of the connection shaft 163). When a center of gravity of the right rear seat 91 shifts rearwardly beyond the axial centerline 124, the right rear seat 91 swings rearwardly and downwardly under its own weight. Thereafter, as shown in FIG. 12, the right rear seat 91 is stowed in the stowing recessed portion 31 with the bottom surface 45 facing upwardly. In so doing, the operator can adjust a lowering speed of the front strap 13, holding the front strap 131, thereby adjusting a speed of the rearward and downward swinging of the right rear seat 91.

The bottom surface 45 lies flat and is substantially flush with the floor 17 when the right rear seat 91 is stowed in the stowing recessed portion 31. In this state, the tailgate 16 (FIG. 3) can be opened and luggage can be easily loaded onto the floor 17 and the bottom surface 45 from behind the vehicle 10. In addition, it becomes possible to go to or out from the floor 17 and the bottom surface 45 through the rear part of the vehicle 10.

Figure 14:
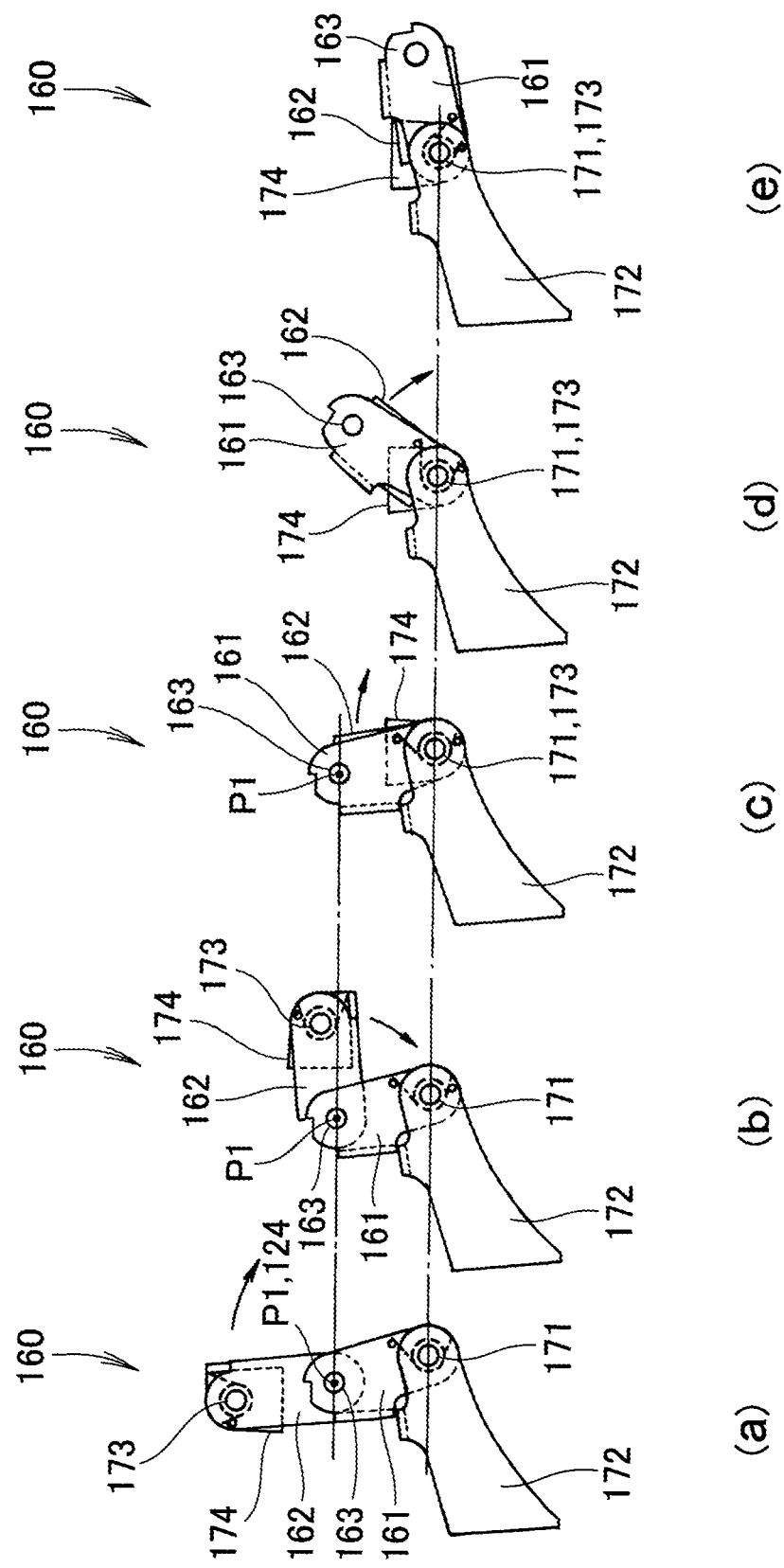
FIG. 14 is a view showing a function of the inner support mechanism shown in FIG. 10.

Operation of the inner support mechanism 160 will be discussed with reference to FIG. 10, FIG. 12 and FIG. 14.

FIG. 14(a) shows the inner support mechanism 160 with the right rear seat 91 in the seatable position, in correspondence to FIG. 10. The first support member 161, the second support member 162 and the second bracket 174 are erected in orientation substantially perpendicular to the first bracket 172.

Then, an operator lifts up the front portion of the seat cushion 36 (FIG. 10), whereupon the seat cushion 36 and the second support member 162 begin to swing rearwardly on the connection shaft 163. When the operator turns the front portion of the seat cushion 36 rearwardly by further lifting the front portion of the seat cushion 36. As a result, the second support member 162 assumes a downward directed position shown in FIG. 14(c) via a position shown in FIG. 14(b). At this time, the seat cushion 36 is stowed in the stowing recessed portion 31, as shown in FIG. 12.

By thus swinging the second support member 162 rearwardly on the connection shaft 163 relative to the first support member 161, the right rear seat 91 can swing rearwardly on the connection shaft 163 into the stowed position in the stowing recessed portion 31.

When the right rear seat 91 is stowed in the stowing recessed portion 31, the second support member 162 overlaps the first support member 161, as shown in FIG. 14(c), such that the center P3 of the second support shaft 173 is aligned with the center P2 of the first support shaft 171. The first and second support members 161, 162 still remain protruding above the floor 17, as shown by a phantom line of FIG. 12.

When the operator then pushes the first and second support members 161, 162 rearwardly, the first and second support members 161, 162 swing rearwardly on the first support shaft 171, as shown in FIG. 14(c). Thereafter, the first and second support members 161, 162 are put into a substantially horizontal position shown in FIG. 14(e) via a position shown in FIG. 14(d). As a result, the first and second support members 161, 162 are received in the stowing recessed portion 31, as shown by a solid line of FIG. 12. That is, the first and second support members 161, 162 are located lower than the floor 17.

Figure 15:
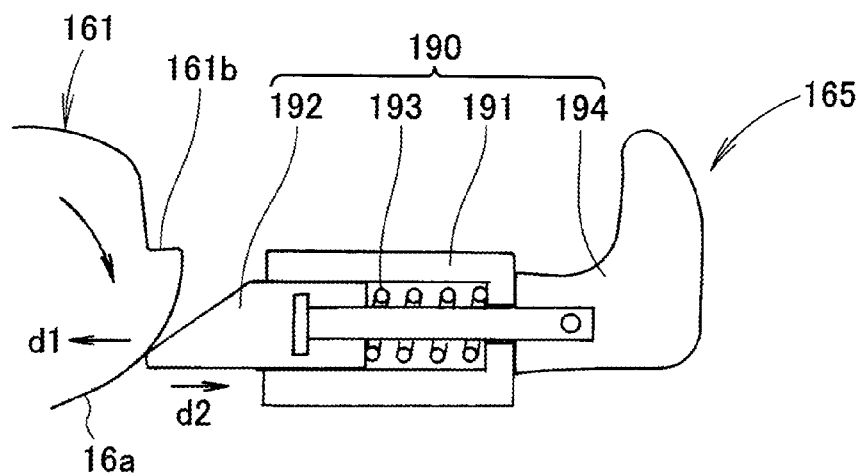
FIG. 15 is a view showing a function of a locking device during rearward swinging of a first support member shown in FIG. 13.

During the rearward swinging of the first support member 161, the distal end surface 161a of the first support member 161 forces a distal end portion of the slider 192 back, as shown in FIG. 15. The slider 192 moves back in a direction of an arrow d2 against an urging force of the return spring 193.

Figure 16:
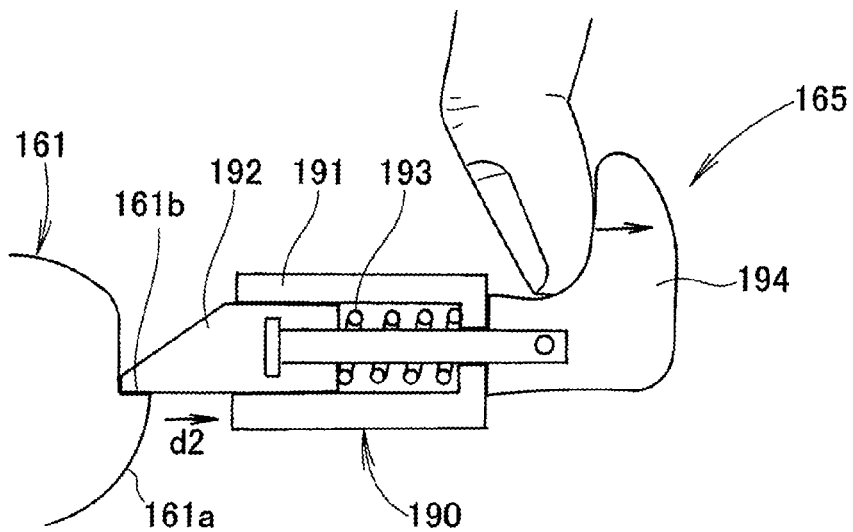
FIG. 16 is a view showing that the locking device shown in FIG. 15 is put in a locking state.
Figure 17:
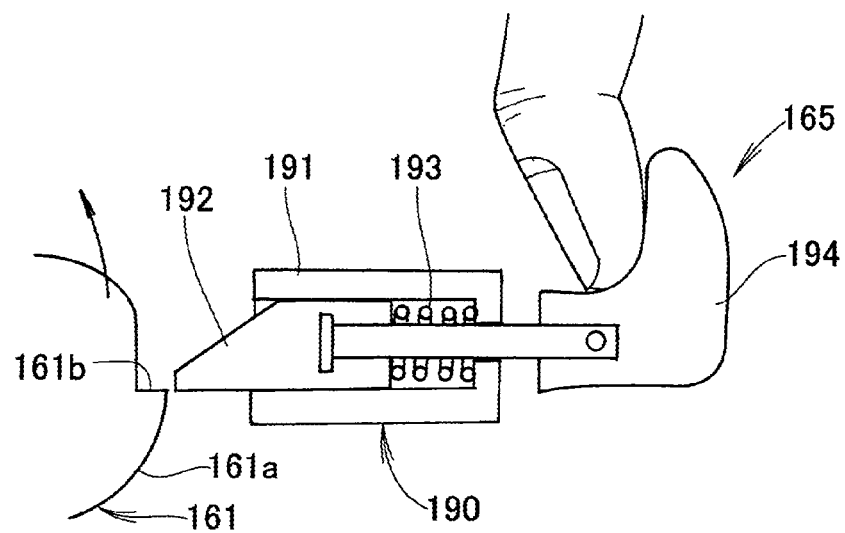
FIG. 17 is a view showing that the locking device shown in FIG. 16 is put into an unlocking state.

The further rearward swinging of the first support member 161 brings the recessed portion 161b of the distal end surface 161a into opposed relationship to the distal end portion of the slider 192, as shown in FIG. 16, whereupon the distal end portion of the slider 192 is advanced by the urging force of the return spring 193 into engagement with the recessed portion 161b. As a result, the locking device 165 locks the first support member 161. That is, as shown in FIG. 13, at a time the first and second support members 161, 162 are set in folded positions in the stowing recessed portion 31, the first and second support members 161, 162 are automatically locked in the folded positions by the locking device 165.

A sequence of subsequent operations for returning the right rear seat 91 to the initial seatable position is as follows. At first, the locking device 165 needs to be put into an unlocking state. To bring the locking device 165 into the unlocking state, an operator pulls the knob 194 with his finger, as shown in FIG. 16, thereby moving the slider 192 back in the direction of the arrow d2 to release the slider 192 from the recessed portion 161b. This results in putting the locking device 165 in the unlocking state. As shown in FIG. 13, the first support member 161 is urged by the first return spring 175 in such a manner as to swing upwardly (counterclockwise). For this reason, the first support member 161 is swung upwardly by the urging force of the first return spring 175, such that the first support member 161 is automatically returned to an erect position shown by the phantom line of FIG. 12. Thereafter, the operator lifts up the front portion of the seat cushion 36 to return the right rear seat 91 to the initial seatable position shown in FIG. 9.

The description of the embodiment 2 is summarized as follows. The support mechanism 160 for supporting the seats 88, 91 to allow swinging of the seats 88, 91 include the first support member 161, the second support member 162, and the connection shaft 163. By merely setting appropriate points of connection of the second support member 162 to the first support member 161 in correspondence to the heights of the seats 88, 91 from the floor 17, it becomes possible to freely set a range over which the seats 88, 91 supported by the support mechanism 160 swings.

In addition, the support mechanism 160 includes the folding mechanism 164 for folding the first and second support members 161, 162 in such a direction that the first and second support members 161, 162 do not protrude from the floor 17 into the passenger compartment 12 when the seats 88, 91 are stowed in the stowing recessed portion 31. That is, through an easy operation of merely folding the first and second support members 161, 162 after the seats 88, 91 are stowed in the stowing recessed portion 31, it becomes possible to prevent the first and second support members 161, 162 from protruding from the floor 17 into the passenger compartment 12, regardless of appropriately set lengths of the first and second support members 161, 162.

Thus, it becomes possible to minimize upward protrusion of the support mechanisms 160 from the floor 17 and enhance a degree of freedom to design the support mechanisms 160. Since the support mechanism 160 does not protrude upwardly from the floor 17 when the seats 88, 91 are stowed in the stowing recessed portion 31 with the bottom surfaces 45, 45 facing upwardly, an upper side of the floor 17 can be substantially flat. Thus, the seats 88, 91 and the support mechanism 160 do not become obstacles when luggage is loaded onto the rear part of the vehicle 10.

The folding mechanism 164 can be achieved in simple form made basically by the first support shaft 171 and the second support shaft 173.

Figure 18:
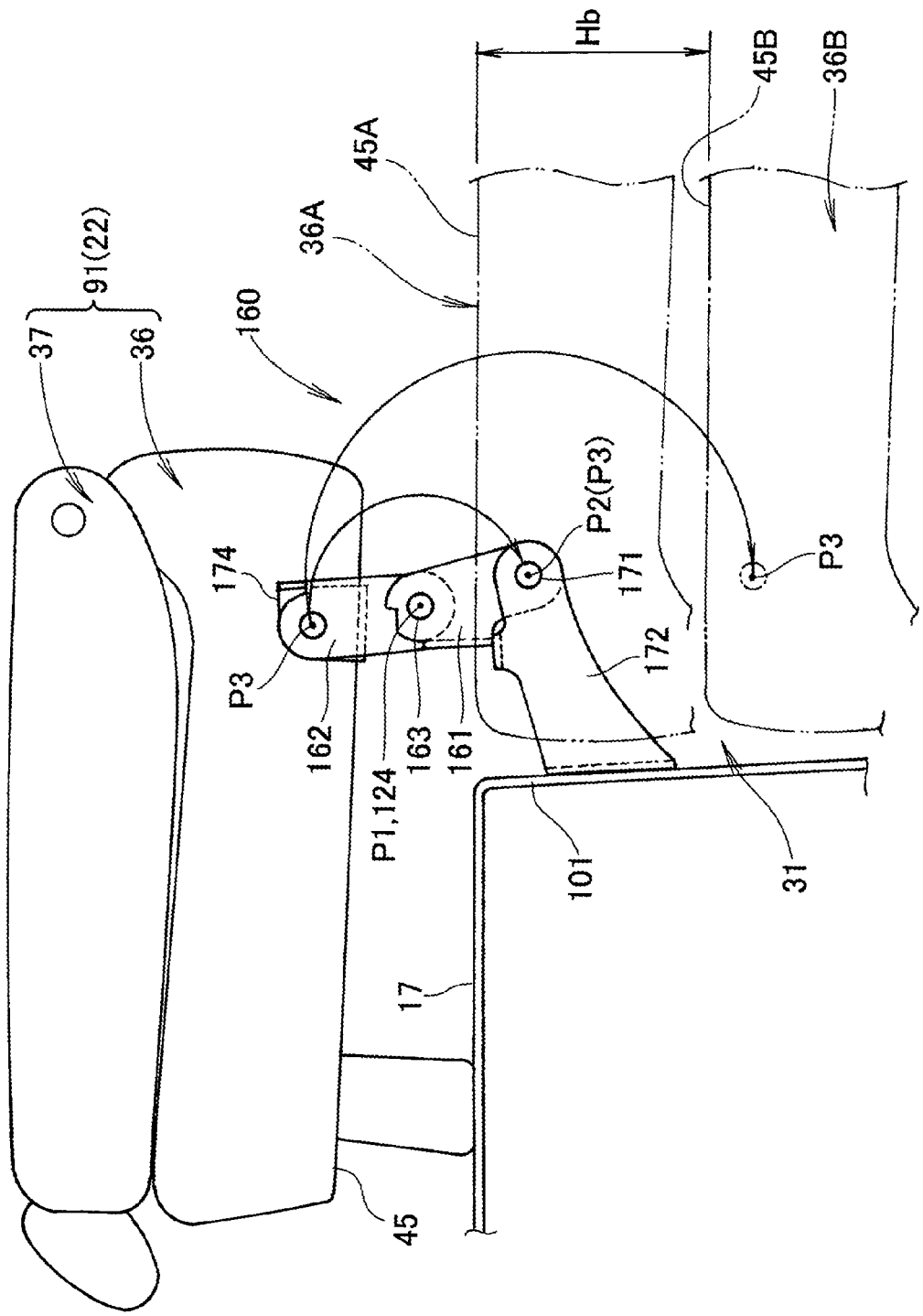
FIG. 18 is a view showing a path of swinging of the seat shown in FIG. 9 from a seatable position to a stowed position.
Figure 19:
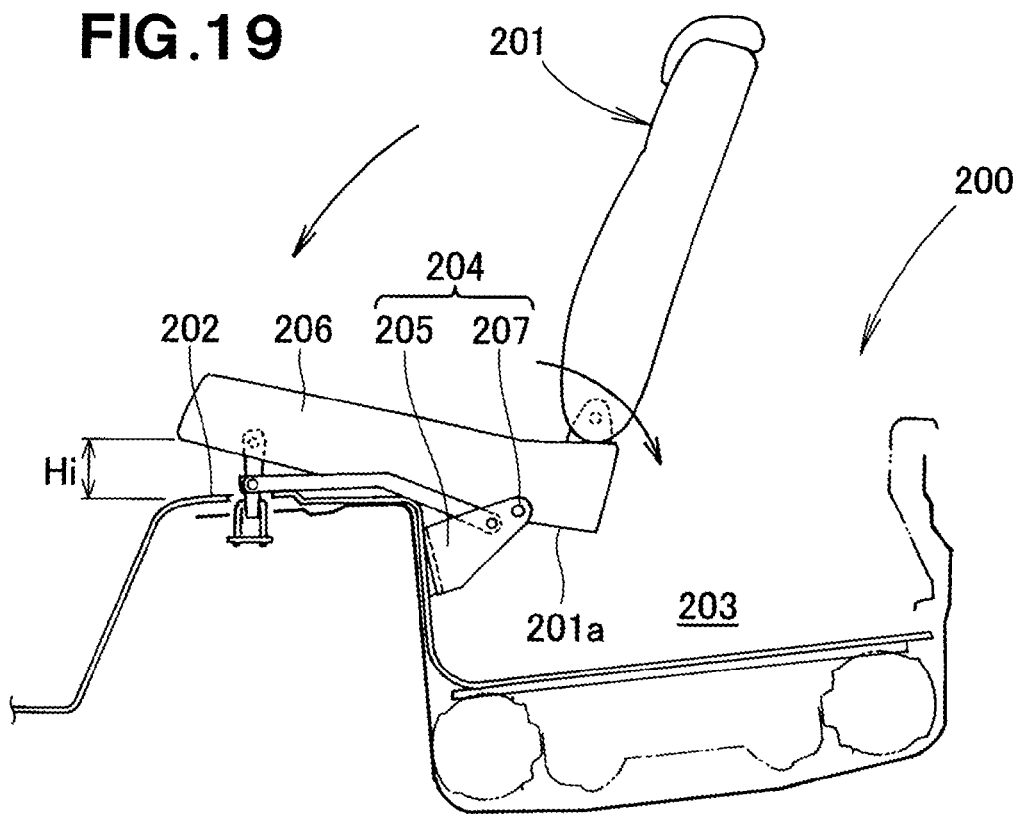
FIG. 19 is a view of a conventional vehicular seat stowing apparatus before stowing a seat.
Figure 20:
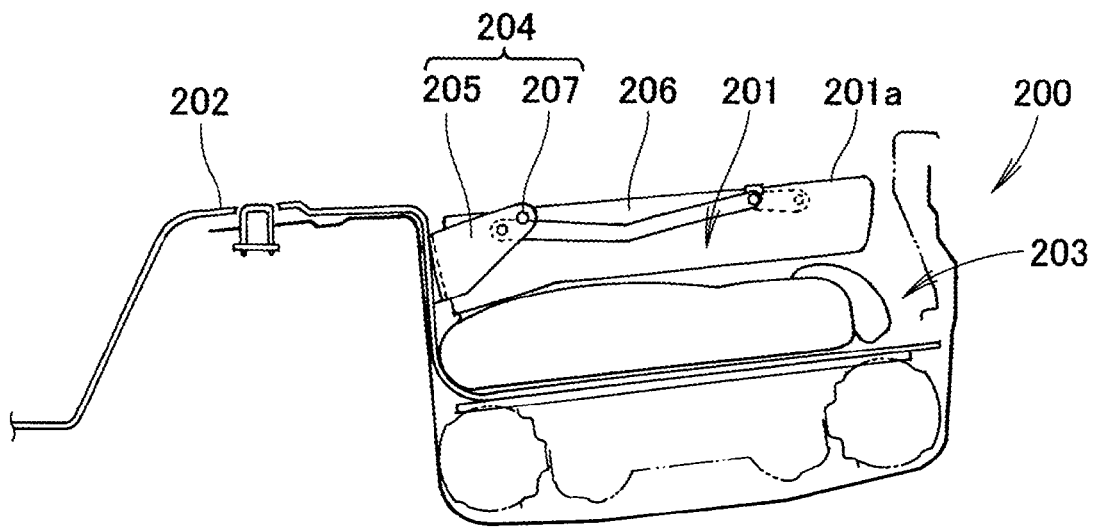
FIG. 20 is a view of the conventional vehicular seat stowing apparatus after stowing the seat.

As shown in FIG. 18, a point on which the seat cushion 36 swings in the front-and-rear direction is defined by the center P1 of the connection shaft 163. The center P1 is located vertically midway between the bottom surface 45 of the seat cushion 36 in the seatable position and the floor 17. For this reason, the seat cushion 36 can swing in a circle having a small radius. A bottom surface 45A of a seat cushion 36A received in the stowing recessed portion 31 may be set at substantially the same level as the floor 17.

If the center P2 of the first support shaft 171 defines a point on which the seat cushion 36 swings in the front-and-rear direction, the center P2 is located lower than the floor 17 and hence the seat cushion 36 may swing in a circle having a large radius. As a result, a bottom surface 45B of a seat cushion 36B received in the stowing recessed portion 31 is located lower. That is, since the point on which the seat cushion 36 swings is lowered from the center P1 to the center P2, the bottom surface 45B is lowered a distance Hb below the bottom surface 45A, in which case the stowing recessed portion 31 should have a greater depth.

As is clear from the foregoing description, in the embodiment 2, the seat cushion 36 swings in the front-and-rear direction on the point defined by the center P1 of the connection shaft 163 and hence the stowing recessed portion 31 can have a smaller depth.

The vehicular seat stowing apparatuses 24, 150 in accordance with the present invention are not limited to those configured to stow the rear seat 22 divided into the left and right ones in the stowing recessed portion 31, but may stow an integrally formed rear seat.

The first support shaft 171 in the embodiment 2 may be configured to support the one end portion of the first support member 161 to allow the first support member to swing in the front-and-rear direction relative to either the floor 17 or the stowing recessed portion 31. That is, the first support shaft 171 and the first bracket 172 are not limited to those located within the stowing recessed portion 31. For example, the first support shaft 171 and the first bracket 172 may be disposed in a slit or recess formed on the floor 17.

INDUSTRIAL APPLICABILITY

The vehicular seat stowing apparatuses 24, 150 in accordance with the present invention are suitable for use in a vehicle having three spaced-apart rows of seats arranged longitudinally of the vehicle.

REFERENCE SIGNS LIST

10 . . . a vehicle, 12 . . . a passenger compartment, 17 . . . a floor, 22 . . . a rear row of a seat, 24 . . . a seat stowing apparatus, 27 . . . a support mechanism, 27A . . . a lateral inner support mechanism, 27B . . . a lateral outer support mechanism, 28 . . . a folding mechanism, 31 . . . a stowing recessed portion, 36 . . . a seat cushion, 37 . . . a seatback, 45 . . . a bottom surface, 71 . . . a first support member, 72 . . . a second support member, 73 . . . a connection shaft, 74 . . . a locking device, 76 . . . a first hinge 77 . . . a hinge centerline of the first hinge, 78 . . . a second hinge, 81 . . . a hinge centerline of the second hinge, 88 . . . a seat (a left rear seat), 91 . . . a seat (a right rear seat), 150 ... a vehicular seat stowing apparatus, 151 ... a support mechanism 160 ... an inner support mechanism, 161 ... a first support member, 162 ... a second support member, 163 ... a connection shaft, 164 ... a folding mechanism, 165 ... a locking device, 171 ... a first support shaft, 172 ... a second support shaft, P1 ... a center of the connection shaft, P2 ... a center of the first support shaft, P3 ... a center of the second support shaft

The invention claimed is:

1. A vehicular seat stowing apparatus comprising a stowing recessed portion formed in a floor and disposed rearwardly of and below a seat located in a seatable position within a passenger compartment, and a support mechanism supporting the seat to allow the seat to swing rearwardly from the seatable position to a stowed position in the stowing recessed portion for stowing the seat in the stowing recessed portion with a bottom surface of the seat facing upwardly, wherein the support mechanism comprises:
a first support member having a first end portion and a second end portion opposite to the first end portion, the first support member being attached to a top portion of the floor at the first end portion thereof;
a second support member having a first end portion and a second end portion opposite to the first end portion, the second support member being attached to the bottom surface of the seat at the first end portion thereof;
a connection shaft pivotally connecting the respective second end portions of the first and second support members to allow the second support member to swing relatively to the first support member in a front-and-rear direction of a vehicle about the connection shaft as the seat swings rearwardly from the seatable position to the stowed position; and a folding mechanism associated with the first and second support members for allowing the first support member and the second support member to be folded in a lateral direction of the vehicle from an unfolded position in which the first and second support members protrude from the top portion of the floor and the bottom surface of the seat, respectively, into the passenger compartment to a folded position in which the first support member and the second support member lie flatwise over the top portion of the floor and the bottom surface of the seat, respectively, while the seat is in the stowed position in the stowing recessed portion.

2. The apparatus of claim 1, wherein the folding mechanism comprises:
a first hinge foldably connecting the first end portion of the first support member to the top portion of the floor; and
a second hinge foldably connecting the first end portion of the second support member to the bottom surface of the seat,
wherein the second hinge is located such that the second hinge has a hinge centerline aligned with a hinge centerline of the first hinge when the seat is in the stowed position stowing recessed portion, and
wherein the aligned hinge centerlines of the first and second hinges extend in the front and rear direction of the vehicle, the first support member and the second support member being foldable in the lateral direction of the vehicle about the aligned hinge centerlines of the first and second hinges.

3. The apparatus of claim 1, further comprising a locking device for locking the first support member and the second support member in the folded position while the seat is in the stowed position in the stowing recessed portion.

* * * * *